US012761165B2

(12) United States Patent
Vine et al.

(10) Patent No.: US 12,761,165 B2
(45) **Date of Patent: *Oct. 13, 2026**

(54) HIGH THROUGHPUT 3D X-RAY IMAGING SYSTEM USING A TRANSMISSION X-RAY SOURCE

(71) Applicant: Sigray, Inc., Concord, CA (US)

(72) Inventors: David Vine, Berkeley, CA (US); Wenbing Yun, Walnut Creek, CA (US); Janos Kirz, Berkeley, CA (US); Sheraz Gul, San Ramon, CA (US); Sylvia Jia Yun Lewis, San Francisco, CA (US); Richard Ian Spink, Pleasant Hill, CA (US)

(73) Assignee: Sigray, Inc., Concord, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/891,371

(22) Filed: Sep. 20, 2024

(65) Prior Publication Data

US 2025/0027889 A1 Jan. 23, 2025

Related U.S. Application Data

(63) Continuation of application No. 18/311,558, filed on May 3, 2023, now Pat. No. 12,153,001, which is a (Continued)

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/204* (2013.01); *G01N 2223/309* (2013.01)

(58) Field of Classification Search
None
See application file for complete search history.

(56) References Cited

U.S. PATENT DOCUMENTS 3,102,196 A 8/1963 Ladell
4,169,228 A 9/1979 Briska et al.
(Continued)

FOREIGN PATENT DOCUMENTS

CN 1656373 A 8/2005
CN 1829910 A 9/2006
(Continued)

OTHER PUBLICATIONS

Office Action for corresponding Chinese Application No. 202180081980.0 dated Jul. 30, 2025.
(Continued)

*Primary Examiner* — Uzma Alam
*Assistant Examiner* — Mamadou Faye
(74) *Attorney, Agent, or Firm* — Patterson + Sheridan, LLP

(57) ABSTRACT

A three-dimensional x-ray imaging system includes at least one detector and an x-ray source including an x-ray transmissive vacuum window. The x-ray source is configured to produce diverging x-rays emerging from the vacuum window and propagating along an x-ray propagation axis extending through a region of interest of an object to the at least one detector. The diverging x-rays have propagation paths within an angular divergence angle greater than 1 degree centered on the x-ray propagation axis. The system further includes at least one sample motion stage configured to rotate the object about a rotation axis. The system further includes a sample mount configured to hold the object and comprises a first portion in the propagation paths of at least some of the diverging x-rays and having an x-ray transmis-
(Continued)

sion greater than 30% for x-rays having energies greater than 50% of a maximum x-ray energy of an x-ray spectrum of the diverging x-rays.

21 Claims, 10 Drawing Sheets

Related U.S. Application Data continuation of application No. 17/540,608, filed on Dec. 2, 2021, now Pat. No. 11,686,692.

(60) Provisional application No. 63/274,367, filed on Nov. 1, 2021, provisional application No. 63/122,354, filed on Dec. 7, 2020.

(56) References Cited

U.S. PATENT DOCUMENTS

| | | | | |
|---|---|---|---|---|
| 4,247,774 | A | 1/1981 | Brooks et al. | |
| 4,642,811 | A | 2/1987 | Georgopoulos | |
| 4,945,552 | A | 7/1990 | Ueda | |
| 5,016,265 | A | 5/1991 | Hoover et al. | |
| 5,132,997 | A | 7/1992 | Kojima | |
| 5,173,928 | A | 12/1992 | Momose et al. | |
| 5,204,887 | A | 4/1993 | Hayashida et al. | |
| 5,220,591 | A | 6/1993 | Ohsugi et al. | |
| 5,249,216 | A | 9/1993 | Ohsugi et al. | |
| 5,280,176 | A | 1/1994 | Jach et al. | |
| 5,684,857 | A | 11/1997 | De Bokx | |
| 5,732,120 | A | 3/1998 | Shoji et al. | |
| 5,778,039 | A | 7/1998 | Hossain | |
| 5,790,628 | A | 8/1998 | Ishida | |
| 5,812,629 | A | 9/1998 | Clauser | |
| 5,832,052 | A | 11/1998 | Hirose et al. | |
| 5,912,940 | A | 6/1999 | O'Hara | |
| 5,930,586 | A | 7/1999 | Jain et al. | |
| 6,108,398 | A | 8/2000 | Mazor et al. | |
| 6,181,773 | B1 | 1/2001 | Lee et al. | |
| 6,195,410 | B1 | 2/2001 | Cash, Jr. | |
| 6,226,347 | B1 | 5/2001 | Golenhofen | |
| 6,381,303 | B1 | 4/2002 | Vu et al. | |
| 6,430,254 | B2 | 8/2002 | Wilkins | |
| 6,442,231 | B1 | 8/2002 | O'Hara | |
| 6,456,688 | B1 | 9/2002 | Taguchi et al. | |
| 6,504,902 | B2 | 1/2003 | Iwasaki et al. | |
| 6,512,814 | B2 | 1/2003 | Yokhin et al. | |
| 6,577,704 | B1 | 6/2003 | Holz | |
| 6,611,577 | B1 | 8/2003 | Yamagami | |
| 6,639,968 | B2 | 10/2003 | Yokhin et al. | |
| 6,711,234 | B1 | 3/2004 | Loxley et al. | |
| 6,763,086 | B2 | 7/2004 | Platonov | |
| 6,829,327 | B1 | 12/2004 | Chen | |
| 6,882,701 | B2 | 4/2005 | Ferrandino et al. | |
| 6,891,627 | B1 | 5/2005 | Levy et al. | |
| 6,895,071 | B2 | 5/2005 | Yokhin et al. | |
| 6,914,723 | B2 | 7/2005 | Yun et al. | |
| 6,934,359 | B2 | 8/2005 | Chen | |
| 7,006,596 | B1 | 2/2006 | Janik | |
| 7,010,086 | B2 | 3/2006 | Chopra | |
| 7,023,955 | B2 | 4/2006 | Chen et al. | |
| 7,075,073 | B1 | 7/2006 | Janik et al. | |
| 7,095,822 | B1 | 8/2006 | Yun | |
| 7,119,953 | B2 | 10/2006 | Yun et al. | |
| 7,120,228 | B2 | 10/2006 | Yokhin et al. | |
| 7,180,979 | B2 | 2/2007 | Momose | |
| 7,183,547 | B2 | 2/2007 | Yun et al. | |
| 7,187,751 | B2 | 3/2007 | Kawahara et al. | |
| 7,215,736 | B1 | 5/2007 | Wang et al. | |
| 7,218,703 | B2 | 5/2007 | Yada et al. | |
| 7,221,731 | B2 | 5/2007 | Yada et al. | |
| 7,245,696 | B2 | 7/2007 | Yun et al. | |
| 7,258,485 | B2 | 8/2007 | Nakano et al. | |
| 7,268,945 | B2 | 9/2007 | Yun et al. | |
| 7,388,942 | B2 | 6/2008 | Wang et al. | |
| 7,394,890 | B1 | 7/2008 | Wang et al. | |
| 7,400,704 | B1 | 7/2008 | Yun et al. | |
| 7,406,151 | B1 | 7/2008 | Yun | |
| 7,414,787 | B2 | 8/2008 | Yun et al. | |
| 7,453,560 | B2 | 11/2008 | Miyake | |
| 7,463,712 | B2 | 12/2008 | Zhu et al. | |
| 7,486,770 | B2 | 2/2009 | Baumann | |
| 7,492,871 | B2 | 2/2009 | Popescu | |
| 7,499,521 | B2 | 3/2009 | Wang et al. | |
| 7,515,684 | B2 | 4/2009 | Gibson et al. | |
| 7,519,153 | B1 | 4/2009 | Moore | |
| 7,522,698 | B2 | 4/2009 | Popescu | |
| 7,522,708 | B2 | 4/2009 | Heismann | |
| 7,532,704 | B2 | 5/2009 | Hempel | |
| 7,551,719 | B2 | 6/2009 | Yokhin et al. | |
| 7,551,722 | B2 | 6/2009 | Ohshima et al. | |
| 7,561,662 | B2 | 7/2009 | Wang et al. | |
| 7,564,941 | B2 | 7/2009 | Baumann | |
| 7,639,786 | B2 | 12/2009 | Baumann | |
| 7,646,843 | B2 | 1/2010 | Popescu et al. | |
| 7,653,174 | B2 | 1/2010 | Mazor et al. | |
| 7,653,177 | B2 | 1/2010 | Baumann et al. | |
| 7,680,243 | B2 | 3/2010 | Yokhin et al. | |
| 7,778,389 | B2 | 8/2010 | Yoneyama | |
| 7,787,588 | B1 | 8/2010 | Yun et al. | |
| 7,796,725 | B1 | 9/2010 | Yun et al. | |
| 7,796,726 | B1 | 9/2010 | Gendreau et al. | |
| 7,809,113 | B2 | 10/2010 | Aoki et al. | |
| 7,813,475 | B1 | 10/2010 | Wu et al. | |
| 7,817,777 | B2 | 10/2010 | Baumann et al. | |
| 7,848,483 | B2 | 12/2010 | Platonov | |
| 7,864,922 | B2 | 1/2011 | Kawabe | |
| 7,889,838 | B2 | 2/2011 | David et al. | |
| 7,899,154 | B2 | 3/2011 | Chen et al. | |
| 7,920,676 | B2 | 4/2011 | Yun et al. | |
| 7,924,973 | B2 | 4/2011 | Kottler et al. | |
| 7,945,018 | B2 | 5/2011 | Heismann | |
| 7,949,092 | B2 | 5/2011 | Brons | |
| 7,949,095 | B2 | 5/2011 | Ning | |
| 7,974,379 | B1 | 7/2011 | Case et al. | |
| 7,983,381 | B2 | 7/2011 | David et al. | |
| 8,005,185 | B2 | 8/2011 | Popescu | |
| 8,009,796 | B2 | 8/2011 | Popescu | |
| 8,009,797 | B2 | 8/2011 | Ouchi | |
| 8,041,004 | B2 | 10/2011 | David | |
| 8,058,621 | B2 | 11/2011 | Kommareddy | |
| 8,068,579 | B1 | 11/2011 | Yun et al. | |
| 8,073,099 | B2 | 12/2011 | Niu et al. | |
| 8,120,683 | B1 * | 2/2012 | Tumer | H04N 23/30<br>348/295 |
| 8,139,711 | B2 | 3/2012 | Takahashi | |
| 8,165,270 | B2 | 4/2012 | David et al. | |
| 8,184,771 | B2 | 5/2012 | Murakoshi | |
| 8,233,587 | B2 | 7/2012 | Sato | |
| 8,243,879 | B2 | 8/2012 | Itoh et al. | |
| 8,306,183 | B2 | 11/2012 | Koehler | |
| 8,351,570 | B2 | 1/2013 | Nakamura | |
| 8,353,628 | B1 | 1/2013 | Yun et al. | |
| 8,374,309 | B2 | 2/2013 | Donath | |
| 8,451,975 | B2 | 5/2013 | Tada | |
| 8,513,603 | B1 | 8/2013 | Lederman et al. | |
| 8,559,594 | B2 | 10/2013 | Ouchi | |
| 8,559,597 | B2 | 10/2013 | Chen et al. | |
| 8,565,371 | B2 | 10/2013 | Bredno | |
| 8,591,108 | B2 | 11/2013 | Tada | |
| 8,602,648 | B1 | 12/2013 | Jacobsen et al. | |
| 8,632,247 | B2 | 1/2014 | Ishii | |
| 8,755,487 | B2 | 6/2014 | Kaneko | |
| 8,767,915 | B2 | 7/2014 | Stutman | |
| 8,767,916 | B2 | 7/2014 | Hashimoto | |
| 8,781,069 | B2 | 7/2014 | Murakoshi | |
| 8,824,629 | B2 | 9/2014 | Ishii | |
| 8,855,265 | B2 | 10/2014 | Engel | |
| 8,859,977 | B2 | 10/2014 | Kondoh | |
| 8,908,824 | B2 | 12/2014 | Kondoh | |
| 8,972,191 | B2 | 3/2015 | Stampanoni et al. | |
| 8,989,474 | B2 | 3/2015 | Kido et al. | |
| 9,001,967 | B2 | 4/2015 | Baturin | |
| 9,016,943 | B2 | 4/2015 | Jacobsen et al. | |

(56) References Cited

U.S. PATENT DOCUMENTS 9,025,725 B2 5/2015 Kiyohara et al.
9,031,201 B2 5/2015 Sato
9,036,773 B2 5/2015 David et al.
9,063,055 B2 6/2015 Ouchi
9,086,536 B2 7/2015 Pang et al.
9,129,715 B2 9/2015 Adler et al.
9,222,899 B2 12/2015 Yamaguchi
9,230,703 B2 1/2016 Mohr et al.
9,234,856 B2 1/2016 Mukaide
9,291,578 B2 3/2016 Adler
9,329,141 B2 5/2016 Stutman
9,357,975 B2 6/2016 Baturin
9,439,613 B2 9/2016 Stutman
9,448,190 B2 9/2016 Yun et al.
9,453,803 B2 9/2016 Radicke
9,480,447 B2 11/2016 Mohr et al.
9,486,175 B2 11/2016 Fredenberg et al.
9,494,534 B2 11/2016 Baturin
9,532,760 B2 1/2017 Anton et al.
9,541,511 B2 1/2017 Vigliante
9,551,677 B2 1/2017 Mazor et al.
9,557,280 B2 1/2017 Pfeiffer et al.
9,570,265 B1 2/2017 Yun et al.
9,588,066 B2 3/2017 Pois et al.
9,594,036 B2 3/2017 Yun et al.
9,632,040 B2 4/2017 Stutman
9,700,267 B2 7/2017 Baturin et al.
9,715,989 B2 7/2017 Dalakos et al.
9,719,947 B2 8/2017 Yun et al.
9,748,012 B2 8/2017 Yokoyama
9,757,081 B2 9/2017 Proksa
9,761,021 B2 9/2017 Koehler
9,770,215 B2 9/2017 Souchay et al.
9,778,213 B2 10/2017 Bakeman et al.
9,823,203 B2 11/2017 Yun et al.
9,826,949 B2 11/2017 Ning
9,841,388 B2 12/2017 Creux et al.
9,861,330 B2 1/2018 Rossl
9,874,531 B2 1/2018 Yun et al.
9,881,710 B2 1/2018 Roessl
9,916,655 B2 3/2018 Sampanoni
10,028,716 B2 7/2018 Rossl
10,045,753 B2 8/2018 Teshima
10,074,451 B2 9/2018 Kottler et al.
10,076,297 B2 9/2018 Bauer
10,085,701 B2 10/2018 Hoshino
10,141,081 B2 11/2018 Preusche
10,151,713 B2 12/2018 Wu et al.
10,153,061 B2 12/2018 Yokoyama
10,153,062 B2 12/2018 Gall et al.
10,247,683 B2 4/2019 Yun et al.
10,267,752 B2 4/2019 Zhang et al.
10,267,753 B2 4/2019 Zhang et al.
10,295,485 B2 5/2019 Yun et al.
10,304,580 B2 5/2019 Yun et al.
10,349,908 B2 7/2019 Yun et al.
10,352,695 B2 7/2019 Dziura et al.
10,352,880 B2 7/2019 Yun et al.
10,401,309 B2 9/2019 Yun et al.
10,416,099 B2 9/2019 Yun et al.
10,466,185 B2 11/2019 Yun et al.
10,473,598 B2 11/2019 Ogata et al.
10,485,492 B2 11/2019 Koehler et al.
10,514,345 B2 12/2019 Ogata et al.
10,514,346 B2 12/2019 Sako
10,568,588 B2 2/2020 Koehler et al.
10,578,566 B2 3/2020 Yun et al.
10,634,628 B2 4/2020 Kasper et al.
10,653,376 B2 5/2020 Yun et al.
10,697,902 B2 6/2020 Sharma et al.
10,782,252 B2 9/2020 Gateshki et al.
10,794,845 B2 10/2020 Filsinger
10,895,541 B2 1/2021 Shchegrov et al.
10,962,491 B2 3/2021 Yun et al.
10,976,270 B2 4/2021 Wormington
10,989,819 B2 4/2021 Wieczorek et al.
11,054,375 B2 7/2021 Seidler et al.
11,175,243 B1 11/2021 Yun et al.
11,215,572 B2 1/2022 Yun et al.
11,378,530 B2 7/2022 Sato et al.
11,549,895 B2 1/2023 Yun et al.
11,686,692 B2 * 6/2023 Vine .................... G01N 23/046
378/41
11,733,185 B2 8/2023 Ogata et al.
11,796,490 B2 10/2023 Seidler et al.
11,885,755 B2 1/2024 Yun et al.
12,209,977 B2 1/2025 Yun et al.
2001/0046276 A1 11/2001 Schneider et al.
2002/0090051 A1 7/2002 Oikawa
2002/0150208 A1 10/2002 Yohkin et al.
2003/0072413 A1 4/2003 Yokhin et al.
2003/0142781 A1 7/2003 Kawahara
2003/0215060 A1 11/2003 Ohzawa
2003/0223536 A1 12/2003 Yun et al.
2004/0028186 A1 2/2004 Yokhin et al.
2004/0047446 A1 3/2004 Platonov
2005/0087699 A1 4/2005 Miyake
2005/0265517 A1 12/2005 Gary
2005/0282300 A1 12/2005 Yun et al.
2005/0286680 A1 12/2005 Momose
2006/0062350 A1 3/2006 Yokhin
2006/0088139 A1 4/2006 Nankano et al.
2006/0120508 A1 6/2006 Chen
2006/0169893 A1 8/2006 Lee et al.
2006/0182322 A1 8/2006 Bernhardt et al.
2007/0069154 A1 3/2007 Sullivan
2007/0108387 A1 5/2007 Yun et al.
2007/0183563 A1 8/2007 Baumann
2007/0183579 A1 8/2007 Baumann et al.
2007/0189449 A1 8/2007 Baumann
2007/0248215 A1 10/2007 Ohshima et al.
2007/0285643 A1 12/2007 Wedowski et al.
2008/0043908 A1 2/2008 Teramoto et al.
2008/0084966 A1 4/2008 Aoki et al.
2008/0159475 A1 7/2008 Mazor et al.
2008/0170662 A1 7/2008 Reinhold
2008/0181363 A1 7/2008 Fenter et al.
2008/0273662 A1 11/2008 Yun
2009/0003516 A1 1/2009 Chen et al.
2009/0052619 A1 2/2009 Endoh
2009/0092227 A1 4/2009 David
2009/0154640 A1 6/2009 Baumann et al.
2009/0316857 A1 12/2009 David et al.
2010/0061508 A1 3/2010 Takahashi
2010/0091947 A1 4/2010 Niu
2010/0172470 A1 7/2010 Kuwabara
2010/0246765 A1 9/2010 Murakoshi
2010/0260315 A1 10/2010 Sato et al.
2010/0284513 A1 11/2010 Kawabe
2010/0310041 A1 12/2010 Adams et al.
2010/0329532 A1 12/2010 Masuda et al.
2011/0206179 A1 8/2011 Bendahan
2011/0222650 A1 9/2011 Muenker
2011/0243302 A1 10/2011 Murakoshi
2011/0255668 A1 10/2011 Hoghoj
2011/0261164 A1 10/2011 Olesen et al.
2011/0268252 A1 11/2011 Ozawa et al.
2012/0041679 A1 2/2012 Stampanoni
2012/0224670 A1 9/2012 Kiyohara et al.
2012/0228475 A1 9/2012 Pang et al.
2013/0011040 A1 1/2013 Kido et al.
2013/0039460 A1 2/2013 Levy
2013/0108012 A1 5/2013 Sato
2013/0108022 A1 5/2013 Kugland et al.
2013/0202084 A1 8/2013 Piorek et al.
2013/0251100 A1 9/2013 Sasaki et al.
2013/0308112 A1 11/2013 Clube et al.
2014/0023973 A1 1/2014 Marconi et al.
2014/0037052 A1 2/2014 Adler
2014/0064445 A1 3/2014 Adler
2014/0072104 A1 3/2014 Jacobsen et al.
2014/0105353 A1 4/2014 Pfeiffer et al.
2014/0105363 A1 4/2014 Chen et al.
2014/0112440 A1 4/2014 David et al.

(56) References Cited

U.S. PATENT DOCUMENTS

2014/0146945 A1 5/2014 Fredenberg et al.
2014/0153692 A1 6/2014 Larkin et al.
2014/0205057 A1 7/2014 Koehler et al.
2014/0226785 A1 8/2014 Stutman et al.
2014/0270060 A1 9/2014 Date et al.
2015/0023472 A1 1/2015 Schmitt et al.
2015/0030126 A1 1/2015 Radicke
2015/0043713 A1 2/2015 Chen
2015/0049860 A1 2/2015 Das
2015/0051877 A1 2/2015 Bakeman et al.
2015/0055743 A1 2/2015 Vedantham et al.
2015/0055745 A1 2/2015 Holzner et al.
2015/0071402 A1 3/2015 Handa
2015/0117599 A1 4/2015 Yun et al.
2015/0117610 A1* 4/2015 Veldman ............. G03F 7/70633 378/86
2015/0146847 A1 5/2015 Liu
2015/0160354 A1 6/2015 Mertens et al.
2015/0243397 A1 8/2015 Yun et al.
2015/0247811 A1 9/2015 Yun et al.
2015/0260663 A1 9/2015 Yun et al.
2015/0270023 A1 9/2015 Adler
2015/0323474 A1 11/2015 Case et al.
2015/0323478 A1 11/2015 Stutman
2015/0357069 A1 12/2015 Yun et al.
2016/0047759 A1 2/2016 Wang et al.
2016/0066870 A1 3/2016 Yun et al.
2016/0091701 A1 3/2016 Raghunathan
2016/0109389 A1 4/2016 Suzuki et al.
2016/0178541 A1 6/2016 Hwang et al.
2016/0206259 A1 7/2016 Auclair et al.
2016/0341674 A1 11/2016 Wu et al.
2016/0351283 A1 12/2016 Adler et al.
2017/0023696 A1* 1/2017 Morton ................. G21K 1/043
2017/0038481 A1 2/2017 Cheng et al.
2017/0047191 A1 2/2017 Yun et al.
2017/0162288 A1 6/2017 Yun et al.
2017/0176356 A1 6/2017 Hoffman et al.
2017/0184520 A1 6/2017 Mortensen et al.
2017/0227476 A1 8/2017 Zhang et al.
2017/0234811 A1 8/2017 Zhang et al.
2017/0261442 A1 9/2017 Yun et al.
2017/0336334 A1 11/2017 Yun et al.
2018/0182131 A1 6/2018 Koehler et al.
2018/0188192 A1 7/2018 Artemiev et al.
2018/0202951 A1 7/2018 Yun et al.
2018/0261352 A1 9/2018 Matsuyama et al.
2018/0306734 A1 10/2018 Morimoto et al.
2018/0323032 A1 11/2018 Strelec et al.
2018/0348151 A1 12/2018 Kasper et al.
2019/0011379 A1 1/2019 Yun et al.
2019/0017946 A1 1/2019 Wack et al.
2019/0027265 A1 1/2019 Dey et al.
2019/0064084 A1 2/2019 Ullom et al.
2019/0086342 A1 3/2019 Pois et al.
2019/0115184 A1 4/2019 Zalubovsky
2019/0145917 A1 5/2019 Yun et al.
2019/0172681 A1 6/2019 Owen et al.
2019/0204757 A1 7/2019 Brussard et al.
2019/0206652 A1 7/2019 Akinwande et al.
2019/0212281 A1 7/2019 Shchgegrov
2019/0216416 A1 7/2019 Koehler et al.
2019/0219713 A1 7/2019 Booker et al.
2019/0257774 A1 8/2019 Seidler et al.
2019/0261935 A1 8/2019 Kitamura
2019/0302042 A1 10/2019 Yun et al.
2019/0317027 A1 10/2019 Tsuboi et al.
2019/0323976 A1 10/2019 Vinshtein
2019/0331616 A1 10/2019 Schaff et al.
2019/0369271 A1 12/2019 Yun et al.
2019/0369272 A1 12/2019 Yun et al.
2019/0391087 A1 12/2019 Matejka et al.
2020/0003712 A1 1/2020 Kataoka et al.
2020/0041429 A1 2/2020 Cho et al.
2020/0072770 A1 3/2020 Yun et al.
2020/0088656 A1 3/2020 Pois et al.
2020/0090826 A1 3/2020 Adler
2020/0098537 A1 3/2020 Yun et al.
2020/0103358 A1 4/2020 Wiell et al.
2020/0155088 A1 5/2020 Gruener et al.
2020/0158662 A1 5/2020 Horiba et al.
2020/0182806 A1 6/2020 Kappler et al.
2020/0194489 A1* 6/2020 Bert .................... H10F 39/1898
2020/0225172 A1 7/2020 Sato et al.
2020/0225173 A1 7/2020 Sato et al.
2020/0225371 A1 7/2020 Greenberg et al.
2020/0232937 A1 7/2020 Yaroshenko et al.
2020/0279351 A1 9/2020 Ratner et al.
2020/0292475 A1 9/2020 Cao et al.
2020/0300789 A1 9/2020 Osakabe et al.
2020/0300790 A1 9/2020 Gellineau et al.
2020/0303265 A1 9/2020 Gellineau et al.
2020/0319120 A1 10/2020 Kitamura et al.
2020/0337659 A1 10/2020 Sano et al.
2020/0378905 A1 12/2020 Safai
2020/0378908 A1 12/2020 Fujimura et al.
2020/0386696 A1 12/2020 Sato et al.
2021/0048297 A1 2/2021 Wu
2021/0055237 A1 2/2021 Shchegrov et al.
2021/0080408 A1 3/2021 Yun et al.
2021/0097258 A1* 4/2021 Mohan ................... G06V 20/64
2021/0116399 A1 4/2021 Ogata et al.
2021/0236069 A1 8/2021 Kotian
2021/0255123 A1 8/2021 Koskinen et al.
2021/0356412 A1 11/2021 Yun et al.
2022/0003694 A1 1/2022 Seidler et al.
2022/0026377 A1 1/2022 Yamamoto
2022/0082515 A1 3/2022 Yun et al.
2022/0178851 A1 6/2022 Yun et al.
2022/0404297 A1 12/2022 Nii
2023/0280291 A1 9/2023 Yun et al.
2023/0349842 A1 11/2023 Yun et al.
2024/0280515 A1 8/2024 Yun et al.
2025/0146960 A1 5/2025 Yun et al.

FOREIGN PATENT DOCUMENTS

CN 101257851 B 9/2008
CN 101532969 B 9/2009
CN 101566591 A 10/2009
CN 101576515 A 11/2009
CN 101413905 A 3/2011
CN 102325498 B 1/2012
CN 102507623 A 6/2012
CN 102551761 A 7/2012
CN 103604818 A 2/2014
CN 104264228 A 1/2015
CN 106568787 4/2017
CN 104068875 A 5/2017
CN 206531787 U 9/2017
CN 110520716 11/2019
CN 113218974 8/2021
CN 109030529 12/2021
CN 114757105 7/2022
DE 102007048743 A1 6/2010
DE 102013013344 A1 2/2015
DE 102013219652 A1 4/2015
EP 0115721 8/1984
EP 0751533 1/1997
EP 1169713 1/2006
EP 2592626 5/2013
EP 3168856 A2 5/2017
JP H01-097844 A 4/1989
JP H04-285847 A 10/1992
JP H05-164987 6/1993
JP H06-188092 7/1994
JP H06-213833 A 8/1994
JP H07-021469 B 3/1995
JP H07-194592 8/1995
JP H07-311165 A 11/1995
JP H08-061941 A 3/1996
JP H08-128971 5/1996
JP H08-184572 7/1996
JP H09-166488 6/1997

(56) References Cited

FOREIGN PATENT DOCUMENTS

| | | | |
|---|---|---|---|
| JP | H10-318737 A | 12/1998 | |
| JP | H11-006804 A | 1/1999 | |
| JP | H11-160500 A | 6/1999 | |
| JP | H11-304728 | 11/1999 | |
| JP | H11-352079 | 12/1999 | |
| JP | 2001-021507 | 1/2001 | |
| JP | 2001-124711 | 5/2001 | |
| JP | 2001-235437 | 8/2001 | |
| JP | 2002-214165 | 7/2002 | |
| JP | 2003-130819 | 5/2003 | |
| JP | 2003-149392 | 5/2003 | |
| JP | 2003-294658 | 10/2003 | |
| JP | 2003-329616 | 11/2003 | |
| JP | 2004-333131 | 11/2004 | |
| JP | 2005-233760 | 9/2005 | |
| JP | 2006-501444 | 1/2006 | |
| JP | 2007-212272 A | 8/2007 | |
| JP | 2007-218683 | 8/2007 | |
| JP | 2008-200359 | 4/2008 | |
| JP | 2008-145111 | 6/2008 | |
| JP | 2008-197495 | 8/2008 | |
| JP | 2009-002805 | 1/2009 | |
| JP | 2009-195349 | 3/2009 | |
| JP | 2009-139337 | 6/2009 | |
| JP | 2010-032341 A | 2/2010 | |
| JP | 2010-127924 | 6/2010 | |
| JP | 2010-236986 | 10/2010 | |
| JP | 2011-033537 | 2/2011 | |
| JP | 2011-095224 | 5/2011 | |
| JP | 2011-242313 | 5/2011 | |
| JP | 2011-107005 | 6/2011 | |
| JP | 2011-218147 | 11/2011 | |
| JP | 2012-032387 | 2/2012 | |
| JP | 2007-309687 | 6/2012 | |
| JP | 2012-112790 | 6/2012 | |
| JP | 2012-112914 | 6/2012 | |
| JP | 2012-187341 | 10/2012 | |
| JP | H06-102399 A | 10/2012 | |
| JP | 2008-039772 | 12/2012 | |
| JP | 2012-254294 | 12/2012 | |
| JP | 2013-042983 | 3/2013 | |
| JP | 2013-508683 | 3/2013 | |
| JP | 2013-096750 | 5/2013 | |
| JP | 2013-113782 | 6/2013 | |
| JP | 2015-529984 | 7/2013 | |
| JP | 2013-181811 | 9/2013 | |
| JP | 2014-178130 | 9/2014 | |
| JP | 2014-222191 | 11/2014 | |
| JP | 2015-033552 | 2/2015 | |
| JP | 2015-047306 | 3/2015 | |
| JP | 2015-072263 | 4/2015 | |
| JP | 2015-077289 | 4/2015 | |
| JP | 2017-040618 | 2/2017 | |
| JP | 2019-078593 | 5/2019 | |
| KR | 10-2004-0072780 | 8/2004 | |
| KR | 10-2005-0038788 A | 4/2005 | |
| KR | 10-2006-0088272 A | 8/2006 | |
| KR | 10-2012-0012391 | 2/2012 | |
| KR | 10-2012-0091591 A | 8/2012 | |
| KR | 10-2014-0059688 | 5/2014 | |
| WO | WO 1998/041992 | 9/1998 | |
| WO | WO 2006/010091 | 1/2006 | |
| WO | WO 2007/125833 | 11/2007 | |
| WO | WO 2008/068044 | 6/2008 | |
| WO | WO 2009/104560 | 8/2009 | |
| WO | WO 2009/121932 | 10/2009 | |
| WO | WO 2011/032572 | 3/2011 | |
| WO | WO 2012/032950 | 3/2012 | |
| WO | WO 2013/004574 | 1/2013 | |
| WO | WO-2013063577 A1 * | 5/2013 | ........... G01N 23/046 |
| WO | WO 2013/111050 | 8/2013 | |
| WO | WO 2013/160153 | 10/2013 | |
| WO | WO 2015/168473 | 11/2015 | |
| WO | WO 2015/176023 | 11/2015 | |
| WO | WO 2015/187219 | 12/2015 | |
| WO | WO 2016/187623 | 11/2016 | |
| WO | WO 2017/031740 | 3/2017 | |
| WO | WO 2017/213996 | 12/2017 | |
| WO | WO 2018/122213 | 7/2018 | |
| WO | WO 2018/175570 | 9/2018 | |
| WO | WO 2015/066333 | 5/2026 | |

OTHER PUBLICATIONS

Abramson et al., "hklhop: a Selection Tool for Asymmetric Reflections of Spherically Bent Crystal Analysers for High Resolution X-ray Spectroscopy," arXiv:2409.10698 (2024).

Andreyev et al., "Boosting the versatility of X-ray microscopes by using robotic arm sample holders," 13th Conf. on Ind. Comp. Tomography, doi.org/10.58286/29261 (2024).

Arsana et al., "Laboratory Liquid-Jet X-ray Microscopy and X-ray Fluorescence Imaging for Biomedical Applications," Int'l J. Mol. Sci., Vo. 25, p. 920 (2024).

Bertilson et al., "Analyzer-free Hard X-ray Interferometry," Phys. Med. Biol. https://doi.org/10.1088/1361-6560/ad1f84 (2024).

Celio et al., "Laboratory X-Ray-Assisted Device Alteration for Fault Isolation and Post-Silicon Debug," 2024 IEEE Int'l Reliability Physics Symp. (IRPS), doi: 10.1109/IRPS48228.2024.10529312 (2024).

Chen et al., "A Ray Tracing Survey of Asymmetric Operation of the X-ray Rowland Circle Using Spherically Bent Crystal Analyzers," arXiv:2409.13119v1 (2024).

Costin et al., "Combining a Computed Laminography Approach with Tomographic Analysis for a Study of Weld Joints," 9th Conf. on Ind. Comp. Tomography, Padova, Italy (iCT 2019), pp. 1-8 (2019).

De Pauw et al., "A review of laboratory, commercially available, and facility based wavelength dispersive X-ray fluorescence spectrometers," J. Anal. At. Spectrom., doi: 10.1039/d3ja00315a (2023).

Detlefs et al., "Fast Chemical Contrast by X-ray Fluorescence Intensity Ratio Detection," Anal. Chem., https://doi.org/10.1021/acs.analchem.3c00623 (2023).

Dreier et al., "Improved resolution in advanced packaging metrology through advanced nano-focus X-ray sources," 2024 25th Int'l Conf. Elect. Packaging Tech. (ICEPT), doi: 10.1109/ICEPT63120.2024.10668783 (2024).

Fahmi et al., "Biological applications of X-ray fluorescence microscopy: exploring the subcellular topography and speciation of transition metals," Current Opinion in Chem. Bio. vol. 11, pp. 121-127 (2007).

Flenner et al., "Dual-beam X-ray nano-holotomography," J. Synch. Rad., https://doi.org/10.1107/51600577524003801 (2024).

Gironda et al., "Asymmetric Rowland circle geometries for spherically bent crystal analyzers in laboratory and synchrotron applications," J. Anal. At. Spectrom., doi: 10.1039/d3ja00437f (2024).

Gobo et al., "Grating-based spatial harmonic frequency X-ray imaging for quantitative characterization of structures with sub-detector spatial resolution," Measurement, doi:10.1016/j.measurement.2024.115601 (2024).

Greczynski et al., "Binding energy referencing in X-ray photoelectron spectroscopy," Nature Reviews Mat'ls, doi.org/10.1038/s41578-024-00743-5 (2024).

Haug et al., "A laboratory-based multifunctional near ambient pressure X-ray photoelectron spectroscopy system for electrochemical, catalytic, and cryogenic studies," Rev. Sci. Instr. vol. 94, 065104, https://doi.org/10.1063/5.0151755 (2023).

Hayashi et al., "Wave-dispersive x-ray spectrometer for simultaneous acquisition of several characteristic lines based on strongly and accurately shaped Ge crystals," Rev. Sci. Instr. vol. 79, 033110 (2008).

Helfen et al., :On the Implementation of computed laminography using synchrotron radiation, Rev. Sci. Instr. vol. 82, pp. 063702-1-063702-8 (2011).

Holden et al., "Probing Sulfur Chemical and Electronic Structure with Experimental Observation and Quantitative Theoretical Prediction of K# and Valence-to -Core K# X-ray Emission Spectroscopy," J. Phys. Chem. A doi: 10.1021/acs.jpca.0c04195 (2020).

(56) References Cited

OTHER PUBLICATIONS

Hönlcke et al., "Reference-free X-ray fluorescence analysis with a micrometer-sized incident beam," Nanotechnology, https://doi.org/10.1088/1361-6528/ad3aff (2024).
Hosseinzadeh et al., "Total-Ionizing-Dose Effects in Integrated Silicon Phase Shifters Using Localized X-Ray Pulses," IEEE Trans. Nucl. Sci., doi.org/10.1109/TNS.2024.3496297 (2024).
Inoue et al., "Monolithic deformable mirror based on lithium niobate single crystal for high-resolution X-ray adaptive microscopy," Optica, vol. 11, No. 5, pp. 621-625 (2024).
Kang et al., "Cold Cathode Flat Panel X-ray Source for Talbot-Lau Grating Interferometer using Zinc Oxide Nanowire Field Emitter Arrays and Periodic Microstructured Anode," ACS Appl. Nano Mater., doi.org/10.1021/acsanm.4c04410 (2024).
Kroupa et al., "High contrast laminography using iterative algorithms," 12th Int'l Workshop on Rad. Imag. Detectors, doi: 10.1088/1748-0221/6/01/C01045 (2010).
Kutukova et al., "Laboratory High-Contrast X-ray Microscopy of Copper Nanostructures Enabled by a Liquid-Metal-Jet X-ray Source," Nanomaterials, vol. 14, p. 448 (2024).
Liao et al., "Design of a full-filled transmission X-ray microscope with 30nm resolution," SPIE Proc. Publ., ChinaXiv:202311.00232v1 (2023).
Lucht et al., "Phase retrieval beyond the homogeneous object assumption for X-ray in-line holographic imaging," arXiv:2403.00461v1 [eess.IV] (2024).
Ma et al., "Exploration and Research of High Contrast and High Resolution Two-dimensional X-Ray Grids," Sixth Conf. Frontiers in Op. Imaging and Tech., Proc. SPIE vol. 13153, doi: 10.1117/12.3014459 (2024).
Mäkinen et al., "Optimization of contrast and dose in X-ray phase-contrast tomography with a Talbot-Lau interferometer," Biomed. Phys. Eng. Express, doi: 10.1088.2057-1976/ad5206 (2024).
Masteghin et al., "Benchmarking of X-Ray Fluorescence Microscopy with Ion Beam Implanted Samples Showing Detection Sensitivity of Hundreds of Atoms," Small Methods, doi: 10.1002/smtd.202301610 (2024).
Matveevskii et al., "Laboratory-based 3D X-ray standing-wave analysis of nanometre-scale gratings," J. Appl. Crystallography, vol. 57, doi.org/10.1107/S1600576724007179 (2024).
Mcrae et al., "In Situ Imaging of Metals in Cells and Tissues," Chem Rev. vol. 109, doi:10.1021/cr900223a (2009).
Miao et al., "A four-grating interferometer for x-ray multi-contrast imaging," Med. Physics, doi: 10.1002/mp.17052 (2024).
Momose et al., "Signal enhancement in X-ray Talbot interferometry with a pair of concave and convex parabolic phase gratings," Appl. Phys. Express, doi.org/10.35848/1882-0786/ad9665 (2024).
Morvay, "Chemical composition depth profiling of thin films using x-ray reflectometry and fluorescence," Ph.D. thesis, Masaryk University, Brno, Czech Republic (2024).
Nakamura et al., "Nanoscale X-ray Tomography of Integrated Circuits using a Hybrid Electron/X-ray Microscope: Results and Prospects," 2023 IEEE Phys. Assurance and Inspection of Electron., doi: 10.1109/PAINE58317.2023.10318004 (2023).
Pieper et al., "Total-Ionizing Dose Damage from X-Ray PCB Inspection Systems," 2024 IEEE Int'l Reliability Physics Symp. (IRPS), doi: 10.1109/IRPS48288.2024.10529337 (2024).
Sefi et al., "25-Fold Resolution Enhancement of X-ray Microscopy Using Multipixel Ghost Imaging," arXiv:2402.14023 (2024).
Shafkat et al., "Assessing Compatibility of Advanced IC Packages to X-Ray Based Physical Inspection," Elec. Device Failure Analysis, vol. 26, No. 3, pp. 14-24 (2024).
Six et al., "Joint multi-contrast CT for edge illumination X-ray phase contrast imaging using split Barzilai-Borwein steps," Op. Express, vol. 32, No. 2, pp. 1135-1150 (2024).
Su et al., "Quantitative Dual-Energy X-ray Imaging Based on K-Edge Absorption Difference," J. Phys. Chem. Lett. vol. 14, pp. 10074-10079 (2023).
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Villarraga-Gómez et al., "Assessing Electronic Devices with Advanced 3D X-ray Imaging and Electron Microscopy" (2023).
Villarraga-Gómez et al., "Assessing Electronics with Advanced 3D X-ray Imaging Techniques, Nanoscale Tomography, and Deep Learning," J. Fail. Anal. And Preven., https://doi.org/10.1007/s11668-024-01989-5 (2024).
Wang, "Recent advances in X-ray grating-based dark-field imaging," Trends in Analytical Chemistry, doi.org/10.1016/j.trac.2024.118052 (2024).
Watanabe et al., "X-ray fluorescence micro-tomography and laminography using an x-ray scanning microscope," J. Phys: Conf. Series 186, 012022 (2009).
Watts et al., "The development of laboratory-based high energy sources for XPS," Surf. Interface Anal., pp. 1-17, doi:10.1002/sia.7300 (2023).
Wirtensohn et al., "The Dark Side of Transmission X-Ray Microscopy," arXiv:2403.18884v1 [physics.optics] Mar. 27, 2024.
Wirtensohn et al., "Nanoscale dark-field imaging in full-field transmission X-ray microscopy," Optica vol. 11, No. 6, doi.org/10.1364/optica.524812 (2024).
Woicik et al., "Soft X-ray absorption spectra," Int. Tables Crystallogr. vol. 1, https://doi.org.10.1107/51574870720008484 (2023).
Xu et al., "A versatile high-speed x-ray microscope for sub-10 nm imaging," Rev. Sci. Instr. vol. 95, p. 113705, doi.org/10.1063/5.0225904 (2024).
Yang et al., "Non-linear super-resolution computed tomography imaging algorithm based on a discrete X-ray source focal spot model," Op. Express, vol. 32, No. 25, pp. 44452-44477 (2024).
Yuan at al., "Micro X-ray fluorescence device based on monocapillary ellipsoidal lens for thin film thickness measurements," Nucl. Inst. Meth. Phys. Res. A, vol. 1058, p. 168923 (2024).
Yuan et al., "Performance characterization of an AI2O3/HfO2 parabolic multilayer based on a laboratory X-ray source," Appl. Op. vol. 63, No. 22 https://doi.org/10.1364/AO.531983 (2024).
Zeng et al., "Restoration of X-ray phase-contrast imaging based on generative adversarial networks," Sci. Rep. doi.org/10/1030/s41598-024-77937-y (2024).
Zhan et al., "A Lightweight Method for Detecting IC Wire Bonding Defects in X-ray Images," Micromachines, vol. 14, p. 1119, https://doi.org/10.3390/mi14061119 (2023).
Zhang et al., "Hard X-ray projection imaging below 5 nm resolution," https://doi.org/10.21203/rs.3.rs-4093473/v1 (2024).
Zhang et al., "Fast and efficient hard X-ray projection imaging below 10 nm resolution," Op. Express, vol. 32, No. 17, pp. 30879-30897 (2024).
Zhang et al., "Virtual X-ray critical dimension metrology via Monte Carlo simulation," Op. Lett. vol. 49, No. 22, pp. 6569-6572 (2024).
Zhao et al., "Applications of the non-negative least-squares deconvolution method to analyze energy-dispersive x-ray fluorescence spectra," Appl. Op., Vo 62, No. 20, pp. 5556-5564 (2023).
"High performance benchtop EDXRF spectrometer with Windows®® software," published by: Rigaku Corp., Tokyo, Japan; 2017.
Altapova et al., "Phase contrast laminography based on Talbot interferometry," Opt. Express, vol. 20, No. 6, (2012) pp. 6496-6508.
Anklamm et al., "A novel von Hamos spectrometer for efficient X-ray emission spectroscopy in the laboratory," Rev. Sci. Instr. vol. 85 p. 053110 (2014).
Bachucki et al., "Laboratory-based double X-ray spectrometer for simultaneous X-ray emission and X-ray absorption studies," J. Anal. Atomic Spectr. DOI:10.1039/C9JA00159J (2019).
Baron et al., "A compact optical design for Bragg reflections near backscattering," J. Synchrotron Rad., vol. 8 (2001), pp. 1127-1130.
Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).
Bech, "In-vivo dark-field and phase-contrast x-ray imaging," Scientific Reports 3, (2013), Article No. 03209.

(56) References Cited

OTHER PUBLICATIONS

Bech, "X-ray imaging with a grating interferometer," University of Copenhagen PhD. Thesis, (May 1, 2009).
Bertaux et al., "Sub-pixel high-resolution imaging of high-energy x-rays inspired by sub-wavelength optical imaging, " Op. Express, vol. 29, No. 22-25, p. 35003 (2021).
Birkholz, "Chapter 4: Grazing Incidence Configurations," Thin Film Analysis by X-ray Scattering (Wiley-VCH Verlag Gmbh & Co. KGaA, Weinheim, Germany, 2006).
Birnbacher et al., "Quantitative X-ray phase contrast computed tomography with grating interferometry," European J. of Nucl. Med. and Mol. Imaging, https://doi.org/10.1007/s00259-021-05259-6 (2021).
Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).
Buchanan et al., "Effective modelling of high-energy laboratory-based x-ray phase contrast imaging utilising absorption masks or gratings," J. Appl. Physics (accepted) (2020).
Chen et al., "Advance in detection of low sulfur content by wavelength dispersive XRF," Proceedings of the Annual ISA Analysis Division Symposium (2002).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cohen et al., "Tunable laboratory extended x-ray absorption fine structure system," Rev. Sci. Instr. vol. 51, No. 3, Mar. 1980, pp. 273-277.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Dewulf et al., "Advances in the metrological traceability and performance of X-ray computed tomography," CIRP Annals—Manuf. Tech. vol. 00, 1-24 (2022).
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).
Dibernardo, "Non-disruptive techniques for depth profiling in photoemission spectroscopy," Nature Review Physics, https://doi.org/10.1038/s42254-021-00331-4 (2021).
Dittler et al., "A mail-in and user facility for X-ray absorption near-edge structure: the CEI-XANES laboratory X-ray spectrometer at University of Washington," J. Synch. Rad. vol. 26, eight pages, (2019).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Du et al., "Removal of artifacts caused by grating imperfections in X-ray phase contrast tomography," J. of Inst. vol. 16, P06039, doi.org/10.1088/1748-0221/16/06/P06039 (2021).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Espes et al., "High-resolution X-ray source with advanced e-beam technology: pushing the resolution limitation for lab-scale NanoCT," Micros. Microanal., vol. 27 (Suppl. 1), pp. 1230 (2021).
Feng et al., "Reduction of Compton Background Noise for X-ray Fluorescence Computed Tomography with Deep Learning," Photonics, vol. 9, p. 108 (2022).
Fernández-Ruiz, "TXRF Spectrometry as a Powerful Tool for the Study of Metallic Traces in Biological Systems," Development in Analytical Chemistry, vol. 1 (2014), pp. 1-14.
Fisher et al., "Laminography in the lab: imaging planar objects using a conventional x-ray CT scanner," Meas. Sci. Technol., vol. 30, p. 035401 (2019).
Flenner et al., "Hard X-ray full-field nanoimaging using a direct photon-counting detector," J. Synch. Rad., https://doi.org/10.1107/S1600577522012103 (2022).
Gaur et al., "On the method of calibration of the energy dispersive EXAFS beamline and Indus-2 and fitting theoretical model to the EXAFS spectrum," Sadhana, vol. 36, No. 3 pp. 3390348 (2011).
Ge et al., "Investigation of the partially coherent effects in a 2D Talbot interferometer," Anal. Bioanal. Chem. vol. 401, (2011), pp. 865-870.
Ge et al., "Self-absorption correction on 2D X-ray fluorescence maps," Sci. Rep. 13, p. 7271, https://doi.org/10.1038/s41598-023-33383-w (2023).
Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).
Graetz et al., "Lenseless C-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.
Gu et al., "A Breakthrough in Resolution and Scan Speed: Overcome the Challenges of 3D X-ray Imaging Workflows for Electronics Package Failure Analysis," 2023 IEEE Int'l Symp. Phys. and Failure Analysis of Integrated Circuits (IPFA), doi: 10.1109/IPFA58228.2023.10249028 (2023).
Günther et al., "Full-field structured-illumination super-resolution X-ray transmission microscopy," Nature Comm. 10:2494 (2019) and supplementary information.
Gustschin et al., "High resolution and sensitivity bi-directional x-ray phase contrast imaging using 2D Talbot array illuminators," arXiv:2105.07347v1 [physics.med-ph] May 16, 2021.
Harasse et al., "Iterative reconstruction in x-ray computed laminography from differential phase measurements", Opt. Express. vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.
Harasse et al., "X-ray Phase Laminography with Talbot Interferometer", in Developments in X-Ray Tomography VII, Proc. SPIE vol. 7804 (2010), 780411.
Hashimoto et al., "Improved reconstruction method for phase stepping data with stepping errors and dose fluctuations," Optics Express, vol. 28, No. 11, pp. 16363-16384 (2020).
Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).
Hemraj-Benny et al., "Near-Edge X-ray Absorption Fine Structure Spectroscopy as a Tool for Investigating Nanomaterials," Small, vol. 2(1), (2006), pp. 26-35.
Hennekam et al., "Trace metal analysis of sediment cores using a novel X-ray fluorescence core scanning method," Quaternary Int'l, https://doi.org/10.1016/j.quaint.2018.10.018 (2018).
Hirano et al., "X-ray zooming optics for analyzer-based multi-contrast computed tomography," J. Synch. Rad. vol. 29, https://doi.org/10.1107/S1600577522001412 (2022).
Holberg et al., "High-Resolution Table-Top NEXAFS Spectroscopy," Anal. Chem. https://10.1021/acs.analchem.1c04374 (2022).
Holfelder et al., "A double crystal von Hamos spectrometer for traceable x-ray emission spectroscopy," Rev. Sci. Instrum. vol. 92, p. 123105 (2021).
Honma et al., Full-automatic XAFS Measurement System of the Engineering Science Research II beamline BL14B2 at Spring-8, 2011, AIP Conference Proceedings 1234, pp. 13-16.
Hoshino et al., "High-energy X-ray micro-laminography to visualize microstructures in dense planar object," J. Synch. Rad. https://doi.org/10.1107/S1600577522012176 (2022).
Howard et al., "High-Definition X-ray Fluorescence Elemental Mapping of Paintings," Anal. Chem., 2012, vol. 84(7), pp. 3278-3286.

(56) References Cited

OTHER PUBLICATIONS

Hu et al., "Improving small animal cone beam CT resolution by mitigating x-ray focal spot induced blurring via deconvolution," Phys. Med. Bio., in press, https://doi.org/10.1088/1361-6560/ac6b7a (2022).
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.
Int'l Preliminary Report on Patentability for PCT/US2021/072695 in 3 pages, dated Mar. 27, 2023.
International Search Report and Written Opinion, PCT/US2021/072695, in 14 pages, dated Apr. 5, 2022.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Jahrman et al., "Vacuum formed temporary spherically and toroidally bent crystal analyzers for x-ray absorption and x-ray emission spectroscopy," Rev. Sci. Inst. vol. 90, 013106 (2019).
Janssens et al., "Recent trends in quantitative aspects of microscopic X-ray fluorescence analysis," TrAC Trends in Analytical Chemistry 29.6 (Jun. 2010): 464-478.
Jiang et al., "X-Ray Phase-Contrast Imaging with Three 2D Gratings," Int. J. Biomed. Imaging, (2008), 827152, 8 pages.
Kalasováet al., "Characterization of a laboratory-based X-ray computed nanotomography system for propagation-based method of phase contrast imaging," IEEE Trans. On Instr. and Meas., DOI 10.1109/TIM.2019.2910338 (2019).
Keyrilainen et al., "Phase contrast X-ray imaging of breast," Acta Radiologica, vol. 51 (8), (2010), pp. 866-884.
Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim et al., "Observation of the Talbot Effect at Beamline 6C Bio Medical Imaging of the Pohang Light Source-II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kim, "Talbot images of wavelength-scale amplitude gratings," Opt. Express vol. 20(5), (2012), pp. 4904-4920.
Kiranjot et al., "Surface and interface characterization of Ru/C/Ru trilayer structure using grazing incidence X-ray reflectivity and X-ray fluorescence," Surf. And Interface Analysis, doi: 10.1002/sia7016 (2021).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906.
Kulow et al., "On the Way to Full-Field X-ray Fluorescence Spectroscopy Imaging with Coded Apertures," J. Anal. At. Spectrom. Doi: 10.1039/C9JA00232D (2019).
Kuwabara et al., "Hard-X-ray Phase-Difference Microscopy with a Low-Brilliance Laboratory X-ray Source", Appl. Phys. Express vol. 4 (2011) 062502.
Leatham et al., "X-ray dark-field and phase retrieval without optics, via the Fokker-Planck equation," arXiv:2122.10999v1, physics.med-ph, Dec. 21, 2021.
Lei et al., "8-inch-diameter field of view for X-ray differential phase-contrast imaging," Nucl. Inst. And Methods in Physics Research A, https://doi.org/10-1016/j.nima.2021.165375 (2021).
Li et al., "X-ray phase-contrast imaging using cascade Talbot-Lau interferometers," Proc. SPIE 10964 (2018), pp. 1096469-1-1096469-6.
Lin et al., "High energy x-ray Talbot-Lau interferometer employing a microarray anode-structured target source to extend the field of view," Phys. Med. Biol., doi.org/10.1088/1361-6560/ad0196 (2023).
Lin et al., "Quasi-Monte Carlo method for calculating X-ray scatter in CT," Op. Express, vol. 29, No. 9, p. 13746 (2021).
Lohmann et al., "An interferometer based on the Talbot effect," Optics Communications vol. 2 (1971), pp. 413-415.
Longo et al., "Flexible Plenoptic X-ray Microscopy," Photonics, vol. 9, p. 98 (2022).
Lübcke et al., "Soft X-ray nanoscale imaging using a sub-pixel resolution charge coupled device (CCD) camera," Rev. Sci. Instrum. vol. 90, 043111 (2019).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multi-lenses for large field of view pixel super-resolution scanning transmission hard X-ray microscopy," J. Synch. Rad., vol. 28 https://doi.org/10.1107/S1600577521001521 (2021).
Matsunaga et al., "Development of projection X-ray microscope with 10 nm spot size," Nodestr. Test. And Eval., https://doi.org.10.1080/10589759.2022.2083616 (2022).
Matsuyama et al., "Wavefront measurement for a hard-X-ray nanobeam using single-grating interferometry", Opt Express vol. 20 (2012), pp. 24977-24986.
Menzies et al., "Dual source X-ray and electron SEM system: Elemental mapping of an Epithermal gold-bearing sample from Karangahake, New Zealand," Microsc. Microanal., vol. 27 (Suppl. 1), pp. 456 (2021).
Miao et al., "Motionless phase stepping in X-ray phase contrast imaging with a compact source," Proceedings of the National Academy of Sciences, vol. 110(48), (2013), pp. 19268-19272.
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Biomedical Imaging by Talbot-Type X-Ray Phase Tomography" in Developments in X-Ray Tomography V, Proc. SPIE vol. 6318 (2006) 63180T.
Momose et al., "Development of grating-based super-resolution x-ray phase imaging," AIP Conf. Proc. 2990, 030003 (2023).
Momose et al., "Grating-Based X-ray Phase Imaging Using Multiline X-ray Source", Jpn. J. Appl. Phys. vol. 48 (2009), 076512.
Momose et al., "Phase Tomography by X-ray Talbot Interferometry for Biological Imaging" Jpn. J. Appl. Phys. vol. 45 2006 pp. 5254-5262.

(56) References Cited

OTHER PUBLICATIONS

Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Phase-Contrast X-Ray Imaging Using an X-Ray Interferometer for Biological Imaging", Analytical Sciences vol. 17 Supplement (2001), pp. i527-i530.
Momose et al., "Recent Progress in X-ray and Neutron Phase Imaging with Gratings," Quantum Beam Science, vol. 4, No. 9; doi:10.3390/qubs4010009 (2020).
Momose et al., "Sensitivity of X-ray Phase Imaging Based on Talbot Interferometry", Jpn. J. Appl. Phys. vol. 47 (2008), pp. 8077-8080.
Momose et al., "X—ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging—From Static Observation to Dynamic Observation-", in International Workshop on X-ray and Neutron Phase Imaging with Gratings AIP Conf. Proc. vol. 1466, (2012), pp. 67-77.
Momose et al., "X-ray Phase Imaging Using Lau Effect", Appl. Phys. Express vol. 4 (2011) 066603.
Momose et al., "X-Ray Phase Imaging with Talbot Interferometry", in "Biomedical Mathematics:Promising Directions in Imaging, Therapy Planning, and Inverse Problems", Y. Censor, M. Jiang & G.Wang, eds. (Medical Physics Publishing, Madison, Wi, USA, 2010), pp. 281-320.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "X-ray Talbot Interferometry with Capillary Plates", Jpn. J. Appl. Phys. vol. 45 (2006), pp. 314-316.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "High-speed X-ray phase imaging and X-ray phase tomography with Talbot interferometer and white synchrotron radiation", Opt. Express vol. 17 (2009), pp. 12540-12545.
Momose et al., "Phase Imaging with an X-ray Talbot Interferometer", Advances in X-ray Analysis vol. 49(3) (2006), pp. 21-30.
Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Morimoto et al., "Design and demonstration of phase gratings for 2D single grating interferometer," Optics Express vol. 23, No. 23, 29399 (2015).
Morimoto et al., "X-ray phase contrast imaging by compact Talbot-Lau interferometer with a signal transmission grating," 2014, Optics Letters, vol. 39, No. 15, pp. 4297-4300.
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Nemeth et al., "Laboratory von Hamos X-ray Spectroscopy for Routine Sample Characterization, " arvix:1607.08045v1 (2016).
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Novichkov et al., "Laboratory-based X-ray spectrometer for actinide science," J. Synch. Rad. vol. 30, doi.org/10.1107/S1600577523006926 (2023).
Nykanen et al., "X-ray scattering in full-field digital mammography," Med. Phys. vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, "A guide into the world of high-resolution 3D imaging: the case of soft X-ray tomography for the life sciences," Biochem. Soc. Trans., https://doi.org/10.1042/BST20210886 (2002).
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Pandeshwar et al., "Envelope modulated x-ray grating interferometry," Appl. Phys. Lett. 120, 193701 (2022).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT," Proc. Of SPIE 12304, 7th Int'l Conf. on Image Formation in X-Ray Computed Tomography, 123042L, doi: 10.1117/12.2646492 (2022).
Pfeiffer et al., " Hard-X-ray dark-field imaging using a grating interferometer," Nature Materials vol. 7, (2008), pp. 134-137.
Pfeiffer et al., "Hard x-ray phase tomography with low brilliance x-ray sources," Phys. Rev. Lett. vol. 98, (2007), 108105.
Pfeiffer et al., "Phase retrieval and differential phase-contrast imaging with low-brilliance X-ray sources," Nature Physics vol. 2, (2006), pp. 258-261.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382.
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Pushie et al., "Elemental and Chemically Specific X-ray Fluorescence Imaging of Biological Systems," Chem. Rev. 114:17, 8499-8541 (2014).
Pushie et al., "Prion protein expression level alters regional copper, iron and zinc content in the mouse brain," Metallomics vol. 3, 206-214 (2011).

(56) References Cited

OTHER PUBLICATIONS

Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).
Seifert et al., "Talbot-Lau x-ray phase-contrast setup for fast scanning of large samples," Sci. Rep. 9:4199, pp. 1-11 (2019).
Shi et al., "Laboratory X-ray interferometry imaging with a fan-shaped source grating," Optics Lett., doi.org/10.1364/OL.426867 (2021).
Shimamura et al., "Soft X-ray nanobeams formed by aberration-reduced elliptical mirrors with large numerical aperture," Opt. Express, vol. 31, No. 23, 38132 (2023).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Soltau et al., "Coherent Diffractive Imaging with Diffractive Optics," Phys. Rev. Lett. 128, 223901 (2022).
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter 1.9.f of "Imaging Modalities for Biological and Preclinical Research: A compendium, vol. 1, Part I: Ex vivo biological imaging," Ed. Walter et al., 8 pages, doi: 10.1088/978-0-7503-3059-6ch42 (2021).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "Differential Phase X-ray Imaging Microscopy with X-ray Talbot Interferometer" Appl. Phys. Express vol. 1 (2008) 117002.
Takeda et al., "X-Ray Phase Imaging with Single Phase Grating", Jpn. J. Appl. Phys. vol. 46 (2007), pp. L89-L91.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tang et al., "Detailed analysis of the interference patterns measured in lab-based X-ray dual-phase grating interferometry through wave propagation simulation," Opt. Ex. vol. 31, No. 2, pp. 1677-1691 (2023).
Tao et al., "Factors Affecting the Spatial Resolution in 2D Grating-Based X-Ray Phase Contrast Imaging," Frontiers in Physics, doi: 10.3389/fphy.2021.672207 (2021).
Tao et al., "Moire artifacts reduction in Talbot-Lau X-ray phase contrast imaging using a three-step iterative approach," Opt. Ex. vol. 30, No. 20, pp. 35096-35111 (2022).
Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Sussex, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot—Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Weitkamp et al., "Design aspects of X-ray grating interferometry," in International Workshop on X-ray and Neutron Phase Imaging with Gratings AIP Conf. Proc. vol. 1466, (2012), pp. 84-89.

(56) References Cited

OTHER PUBLICATIONS

Weitkamp et al., "Hard X-ray phase imaging and tomography with a grating interferometer," Proc. SPIE vol. 5535, (2004), pp. 137-142.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., Tomography with grating interferometers at low-brilliance sources, 2006, SPIE, vol. 6318, Pages OS-1 to OS-10.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. Vol. 35, No. 12, (2010) pp. 1932-1934.
Wilde et al., "Modeling of an X-ray grating-based imaging interferometer using ray tracing," Op. Express vol. 28, No. 17, p. 24657 (2020).
Wilde et al., "Statistical optics modeling of dark-field scattering in X-ray grating interferometers: Part 1. Theory," Op. Express vol. 29, No. 25, p. 40891 (2021).
Wilde et al., "Statistical optics modeling of dark-field scattering in X-ray grating interferometers: Part 2. Simulation," Op. Express vol. 29, No. 25, p. 40917 (2021).
Withers et al., "X-ray computed tomography," Nature Reviews | Methods Primers, vol. 1, No. 18, pp. 1-21 (2021).
Witte et al., "From 2D Stxm to 3D Imaging: Soft X-ray Laminography of Thin Specimens," Nano Lett. vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).
Wobrauschek et al., "Energy Dispersive, X-Ray Fluorescence Analysis," Encyclopedia of Analytical Chemistry, R.A. Meyers, Ed. (Wiley 2010).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Xiao et al., "TXM-Sandbox: an open-source software for transmission X-ray microscopy data analysis," J. Synch. Rad., vol. 29, https://doi.org/10.1107/S1600577521011978, p. 1-10 (2022).
Xu et al., "Comparison of image quality in computed laminography and tomography," Op. Express, vol. 20, No. 2, pp. 794-806 (2012).
Xu et al., "Synchrotron radiation computed laminography for polymer composite failure studies," J. Synch. Rad., vol. 17, pp. 222-226 (2010).
Yamada et al., "Compact full-field hard x-ray microscope based on advanced Kirkpatrick-Baez mirrors," Optica, vol. 7, No. 4 pp. 367-370 (2020).
Yashiro et al., "Distribution of unresolvable anisotropic microstructures revealed in visibility-contrast images using x-ray Talbot interferometry", Phys. Rev. B vol. 84 (2011), 094106.
Yashiro et al., "Hard x-ray phase-imaging microscopy using the self-imaging phenomenon of a transmission grating", Phys. Rev. A vol. 82 (2010), 043822.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Efficiency of capturing a phase image using cone-beam x-ray Talbot interferometry", J. Opt. Soc. Am. A vol. 25 (2008), pp. 2025-2039.
Yashiro et al., "On the origin of visibility contrast in x-ray Talbot interferometry", Opt. Express (2010), pp. 16890-16901.
Yashiro et al., "Optimal Design of Transmission Grating for X-ray Talbot Interferometer", Advances in X-ray Analysis vol. 49(3) (2006), pp. 375-379.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et al., "Hard-X-Ray Phase-Difference Microscopy Using a Fresnel Zone Plate and a Transmission Grating", Phys. Rev. Lett. vol. 103 (2009), 180801.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. Vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Laboratory-scale X-ray absorption spectrometer with a cylindrical Johansson crystal analyzer," Nuclear Inst. And Methods in Physics Research, A (2023), doi: https://doi.org/10.1016/j.nima.2023.168067 (2023).
Zhang et al., "Measurement of the inner diameter of monocapillary with confocal X-ray scattering technology based on capillary X-ray optics," Appl. Opt. (Jan. 8, 2019), doc ID 351489, pp. 1-10.
Zhao et al., "X-ray wavefront sensing and optics metrology using a microfocus x-ray grating interferometer with electromagnetic phase stepping," Appl. Phys. Lett. 120, 181105 (2022).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Zhu et al., "Optical Wafer Defect Inspection at the 10 nm Technology Node and Beyond," 2022 Int. Extrem. Manuf. In press https://doi.org/10.1088/2631-7990/ac64d7 (2022).
Fraunhofer, "High-resolution computed laminography (HRCL) for electronic components," https://www.ikts.fraunhofer.de/en/departments/electronics_microsystems_biomedicine/condition_monitoring_non-destructive_testing/ndt_test_lab/3D-X-ray_inspection_industrial_components/computed_laminography_printed_circuit_board_inspction.html, (2024).
Maisl et al., "Computed Laminography for X-ray Inspection of Lightweight Constructions," 2nd Int'l Symp. On NDT in Aerospace 2010—Mo.3.A.3, https://www.ndt.net/?id+10375 (2010).
YUAN at al., "Micro X-ray fluorescence device based on monocapillary ellopsoidal lens for thin film thickness measurements," Nucl. Inst. Meth. Phys. Res. A, vol. 1058, p. 168923 (2024).
Chinamatira et al., "X-ray phase contrast imaging: An alternative approach to laboratory-based sources," AFLS2024, contribution ID: 198 (2024).
Dreier et al., "X-ray nano-tomography enabling sub-micron resolution failure analysis for advanced packaging," ISTFA 2024: Proc. From 50th Int'l Symp. For Testing and Failure Analysis Conf., https://doi.org/10.31399/asm.co.isifa2021p0169 (2024).

(56) References Cited

OTHER PUBLICATIONS

Hui et al., "Stacked Scintillators Based Multispectral X-Ray Imaging Featuring Quantum-Cutting Perovskite Scintillators With 570 nm Absorption-Emission Shift, " Adv. Mat'ls doi:10.1002/adma.202416360 (2025).
Lee et al., "A system design method for signal-to-noise ratio enhancement in single-grating-based X-ray phase-contrast imaging," Nucl. Eng. & Tech., doi: 10.1016/j.net.2025.103482 (2025).
Lin et al., "A lab-based micro X-ray fluorescence spectrometer with high photon flux and spatial resolution for ancient ceramic research," J. Anal. At. Spectrom., doi: 10.1039/D4JA00319E (2025).
Linsen et al., "Single X-ray Projection Material Decomposition using a Mesh Projector," 14th Conf. Ind. Comp. Tomography, Antwerp, Belgium (iCT 2025) e-Journal of Nondestructive Testing, doi: 10.58286/30756 (2025).
Nguyen et al., "Data-Efficient Deep Learning for Printed Circuit Board Defect Detection Using X-Ray Images," J. IEEE vol. 14, No. 8, pp. 1-14 (2021).
Pasikatan, "Characterization and measurement limitations using non-destructive mueller matrix scatterometry (MMSE) and x-ray diffraction (xXRD) techniques for gate all around (GAA) transistor test structures: Limitations and superlattice effects in advanced Si/Si(1-x)Ge(x) superlattice nanowire test structures and measureability of simulated horizontal GAA test structures," Electronic Theses & Dissertations (2024-present), 109 (2024).
Perez et al., "Phase Contrast Based High Resolution X-Ray Desktop Tomography," Rad. Phys. and Chem. Doi: 10.1016/j.radphyschem.2025.112600 (2025).
Roter et al., "Multifunctional bending magnet beamline with a capillary optic for X-ray fluorescence studies of metals in tissue sections," doi: 10.1101/2025.01.18.633695 (2025).

* cited by examiner

HIGH THROUGHPUT 3D X-RAY IMAGING SYSTEM USING A TRANSMISSION X-RAY SOURCE

CLAIM OF PRIORITY

This application is a continuation of U.S. patent application Ser. No. 18/311,558, filed May 3, 2023, which is a continuation of U.S. patent application Ser. No. 17/540,608 filed Dec. 2, 2021, which is incorporated in its entirety by reference herein and which claims the benefit of priority to U.S. Provisional Appl. Nos. 63/122,354 filed Dec. 7, 2020 and 63/274,367 filed Nov. 1, 2021, each of which is incorporated in its entirety by reference herein.

BACKGROUND

Field

This application relates generally to tomography and laminography x-ray imaging systems.

Description of the Related Art

Three-dimensional (3D) x-ray imaging techniques are useful to image internal structures of objects. Typically, a tomography dataset consisting of x-ray transmission images that are collected over a large angular range (e.g., about 180 degrees; about 360 degrees), and that are subsequently reconstructed to obtain a 3D image. The large angular range is used to avoid (e.g., minimize) 3D image artifacts. A 3D x-ray imaging system comprises an x-ray source configured to illuminate an object for imaging, a position-sensitive x-ray detector configured to record transmission x-ray images, and an electromechanical system to manipulate the object with respect to the x-ray source and the position-sensitive x-ray detector.

X-ray flux incident on a region of interest of the object is inversely proportional to the square of the distance of the region of interest from the x-ray source, this distance can be referred to as the focus object distance (FOD). To achieve high throughput for 3D x-ray imaging, the FOD is selected to be small (e.g., the region of interest placed as close to the x-ray source as possible). For example, in view of the small voxel volume used to achieve the spatial resolution, placing the region of interest close to the x-ray source can be used in 3D x-ray imaging with high spatial resolution using a laboratory microfocus x-ray source. Furthermore, for 3D x-ray imaging of a small region of interest in a larger object (e.g., small regions of interest in a laterally extended planar object, examples of which include but are not limited to interconnects in semiconductor integrated circuit (IC) packages and fine structural details in a large fiber reinforced composite panel), the minimum FOD is limited by the dimensions of the object, which practically limits the achievable throughput because the object is to be rotated through 180 degrees.

However, prior art micro-x-ray computed tomography (μXCT) and micro x-ray computed laminography (μXCL) systems have numerous limitations. For example, FIGS. 1A and 1B schematically illustrate conventional tomography and laminography configurations, respectively, of a laterally extended object (e.g., printed circuit board; wafer) where the region of interest (ROI) is at or near the center of the object. The x-ray source emits an x-ray beam (denoted by a horizontal dashed line) and the thickness of the object in FIGS. 1A and 1B in a direction perpendicular to the page can be equal to or smaller than the object's dimension along the x-ray beam (e.g., such that there is sufficient room between the x-ray source and the x-ray detector for rotating the object about the rotation axis). As seen in FIG. 1A, for tomography, the rotation axis is substantially parallel to the surface normal of the object and is substantially perpendicular to the x-ray beam. As seen in FIG. 1B, for laminography, the rotation axis is substantially parallel to the surface normal of the object and is tilted from a direction substantially perpendicular to the x-ray beam by an angle β. FIGS. 1A and 1B show that such conventional tomography and laminography configurations are not well suited to imaging defects in planes parallel to the surface of the laterally extended objects (e.g., semiconductor IC packages) because the transmitted x-ray spectrum in the tomography/laminography dataset varies with the angle of the x-ray beam axis with respect to the object. As a result, the reconstructed images (e.g., computed tomography or CT images) suffer from radiation hardening and photon starvation artifacts and introduces a dependence of the fidelity of reconstructed features on their orientation with respect to the object rotation axis. The resolution and image quality of reconstructed images in planes parallel to the surface of the laterally extended object are typically worse than in the direction along the surface normal. In addition, neither technique is optimized to achieve a small FOD due to physical interference of the object and the x-ray source. Improving image resolution by reducing x-ray source size with high flux, which can be desirable for many applications, is severely limited with such prior art XCT and XCL systems and methods and higher depth resolution along the surface normal of such extended and/or planar objects is particularly challenging to achieve.

SUMMARY

In certain implementations, a three-dimensional x-ray imaging system is configured to generate a transmission image of a region of interest in an object. The system comprises at least one position-sensitive x-ray detector comprising at least one active element. The system further comprises an x-ray source comprising an x-ray transmissive vacuum window having an outer surface. The x-ray source is configured to produce diverging x-rays, at least some of the diverging x-rays emerging from the vacuum window and propagating along an x-ray propagation axis extending from the x-ray source, through the region of interest of the object, to the at least one active element of the at least one position-sensitive x-ray detector. The diverging x-rays have propagation paths within an angular divergence angle greater than 1 degree centered on the x-ray propagation axis. The x-ray propagation axis is at a first angle with respect to the outer surface of the vacuum window, the first angle in a range of 3 degrees to 45 degrees. The system further comprises at least one sample motion stage configured to rotate the object about a rotation axis and configured such that the rotation axis has a second angle relative to the x-ray propagation axis, the second angle in a range of 45 degrees to 90 degrees. The system further comprises a sample mount on the at least one sample motion stage. The sample mount is configured to hold the object and comprises a first portion in the propagation paths of at least some of the diverging x-rays propagating through the object to the at least one position-sensitive x-ray detector. The first portion has an x-ray transmission greater than 30% for x-rays having energies greater than 50% of a maximum x-ray energy of an x-ray spectrum of the diverging x-rays.

In certain implementations, a three-dimensional x-ray imaging system comprises at least one position-sensitive x-ray detector. The system further comprises an x-ray source comprising an x-ray transmissive vacuum window having an outer surface. The x-ray source is configured to produce diverging x-rays, at least some of the diverging x-rays emerging from the vacuum window and propagating along an x-ray propagation axis extending from the x-ray source. The diverging x-rays propagate through a region of interest of an object to the at least one position-sensitive x-ray detector and have an angular divergence angle greater than 1 degree centered on the x-ray propagation axis. The x-ray propagation axis is at a first angle with respect to the outer surface of the vacuum window, the first angle in a range of 3 degrees to 45 degrees. The system further comprises at least one sample motion stage configured to rotate the object about a rotation axis and configured to adjust the rotation axis to have a second angle relative to the x-ray propagation axis, the at least one sample motion stage having a non-systematic angular wobble less than 5 microradians

DETAILED DESCRIPTION

In certain implementations, a 3D x-ray imaging system enables imaging of an ROI with a very small FOD in a large object to reduce laminographic dataset collection time (e.g., to increase the imaging data collection speed). In certain implementations, the system also provides improved image quality (e.g., fidelity) and higher image resolution in planes parallel to the surface of a laterally extended object, which can be important for many applications, such as metrology, inspection, failure analysis, and process development of semiconductor IC packages (e.g., as solder bumps and Cu interconnects). The x-ray source can be configured to achieve the small FOD and for improving spatial resolution. Certain implementations are configured to use the measurement geometry to "compress" the electron beam focus in one dimension which can allow the use of an asymmetric larger, and therefore higher power, focus which after projection becomes symmetric or almost symmetric which can be desirable to have isotropic spatial resolution. Certain implementations are configured to have an x-ray source comprising an x-ray generating material with a thickness configured to achieve high spatial resolution in a direction substantially perpendicular to the surface of a laterally extended object being analyzed. Additionally, certain implementations comprise additional components and/or methods for implementing several modes of imaging contrast, including Talbot interferometry for obtaining absorption, phase, and darkfield (scattering) contrast, darkfield (scattering) contrast only, and enhanced absorption contrast.

Figure 1A:
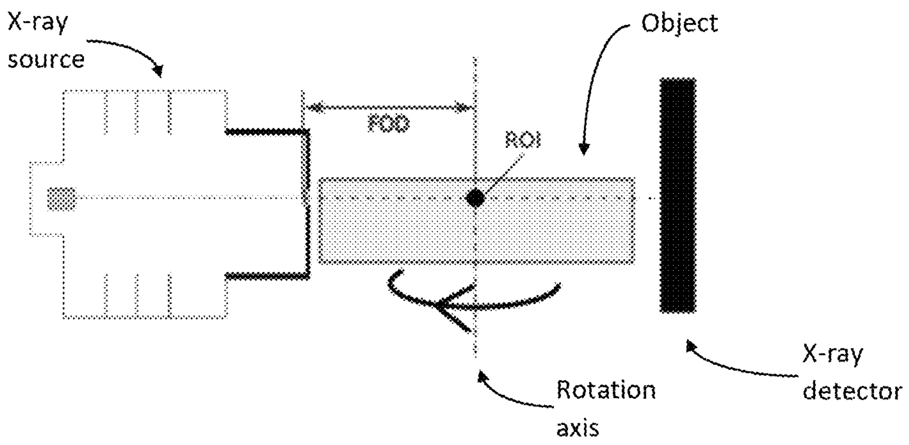
FIGS. 1A and 1B schematically illustrate conventional tomography and laminography configurations, respectively, of a laterally extended object where the region of interest (ROI) is at or near the center of the object.
Figure 1B:
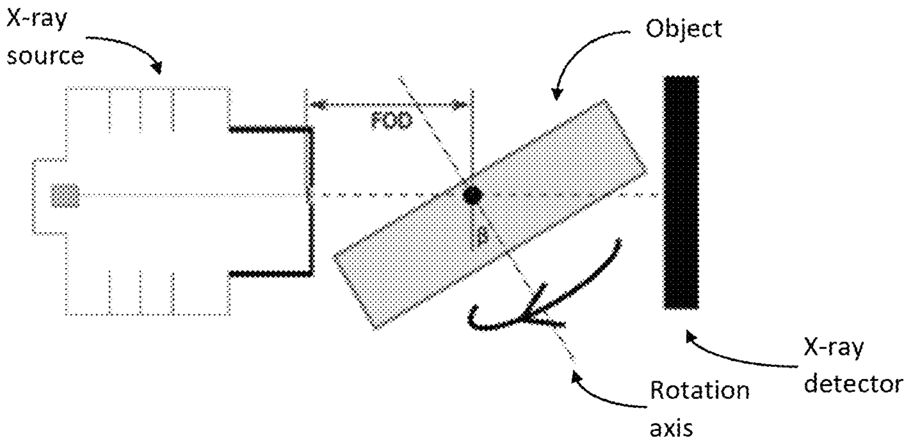
Figure 2:
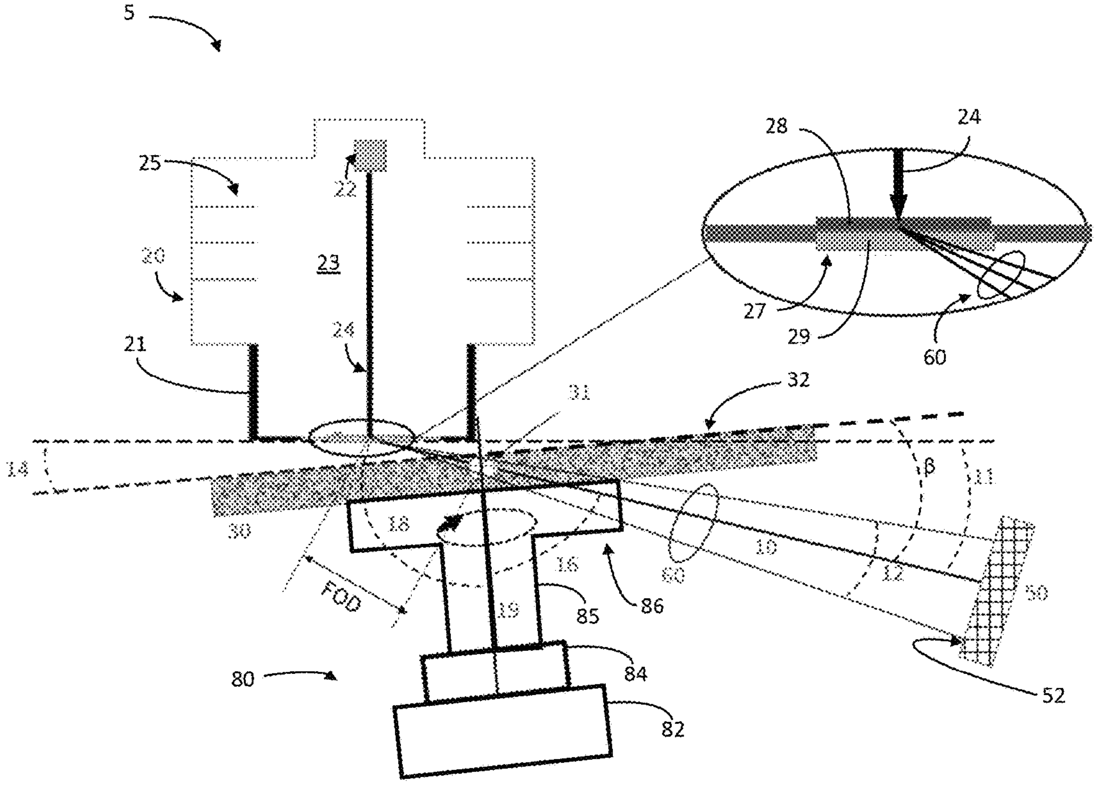
FIG. 2 schematically illustrates an example x-ray 3D imaging system compatible with certain implementations described herein.

FIG. 2 schematically illustrates an example x-ray 3D imaging system 5 compatible with certain implementations described herein. The system 5 comprises an x-ray source 20 and at least one position-sensitive x-ray detector 50 comprising at least one active element 52. The x-ray source 20 comprises an x-ray transmissive vacuum window 29 having an outer surface 27, and the x-ray source 20 is configured to produce diverging x-rays. At least some of the diverging x-rays 60 emerge from the vacuum window 29 and propagate along an x-ray propagation axis 10 extending from the x-ray source 20, through a region of interest 31 of the object 30, to the at least one active element 52 of the at least one position-sensitive x-ray detector 50. The diverging x-rays 60 that impinge the at least one active element 52 have propagation paths within an angular divergence angle 12 greater than 1 degree centered on the x-ray propagation axis 10. The x-ray propagation axis 10 is at a first angle 11 with respect to the outer surface 27 of the vacuum window 29, the first angle 11 in a range less than or equal to 45 degrees, (e.g., less than or equal to 30 degrees; in a range of 3 degrees to 45 degrees; between 5 to 30 degrees; less than 3 degrees).

In certain implementations, the system 5 further comprises at least one sample motion stage 80 (e.g., motorized and computer-controlled; comprising an electromechanical system). The at least one sample motion stage 80 is configured to rotate the object 30 about a rotation axis 19. The sample motion stage 80 is configured such that the rotation axis 19 has a second angle 16 relative to the x-ray propagation axis 10, the second angle 16 in a range greater than or equal to 45 degrees (e.g., in a range of 45 degrees to 90 degrees). In certain other implementations, the second angle 16 is less than 45 degrees. The second angle 16 of certain implementations can be in a range greater than or equal to 45 degrees and the rotation axis 19 can be at a third angle relative to a surface normal of the outer surface 27 of the vacuum window 29, the third angle in a range less than 45 degrees (e.g., less than 30 degrees). In certain implementations, the system 5 comprises a mechanism configured to vary the third angle. For example, the mechanism can comprise at least one tilt stage (e.g., goniometer; electromechanical motion driver; rotary motor; stepper motor; motor with encoder; linear motion driver with worm drive) configured to tilt the x-ray source 20 relative to the rotation axis 19 and/or the rotation axis 19 relative to the x-ray source 20.

In certain implementations, the system 5 further comprises a sample mount 85 on the at least one sample motion stage 80 and configured to hold the object 30. The sample mount 85 comprises a first portion 86 in the propagation paths of at least some of the diverging x-rays 60 propagating through the object 30 to the at least one position-sensitive x-ray detector 50. The first portion 86 has an x-ray transmission greater than 30% (e.g., greater than 50%) for x-rays having energies greater than 50% of a maximum x-ray energy of an x-ray spectrum of the diverging x-rays 60.

The example system 5 of FIG. 2 is configured to image a region-of-interest (ROI) 31 in a large or laterally extended object 30 (e.g., positioned to be substantially parallel to the outer surface 27 of the vacuum window 29) so as to minimize the FOD between the ROI 31 and the x-ray source 20. For example, for imaging a ROI 31 in a large three-dimensional object 30, the object 30 can be placed close to the x-ray source 20 (e.g., at a distance less than 70 millimeters between the outer surface 27 of the vacuum window 29 and the surface 32 of the object 30) and centered to the rotation axis 19 of the at least one sample motion stage 80. A three-dimensional (3D) image dataset of the ROI 31 can be collected by recording a series of x-ray transmission images of the diverging x-rays 60 that are transmitted through the ROI 31 of the object 30 to the at least one active element 52 of the at least one position-sensitive x-ray detector 50, with the object 30 rotated about the rotation axis 19 over an angular range (e.g., between 180 and 360 degrees). A computed laminography dataset can be reconstructed using a known laminography reconstruction method, to obtain a 3D image of the ROI 31. For another example, for imaging a ROI 31 in a planar object 30 (e.g., solder bumps and/or interconnects in a semiconductor IC package), the object 30 can be positioned so that the surface 32 of the object 30 closer to the ROI 31 faces the vacuum window 29. For a large/planar object 30, a small angle 14 between the outer surface 27 of the vacuum window 29 and the surface 32 of the object 30 can be used to place the ROI 31 close to the x-ray source 20 to increase x-ray flux on the ROI 31 and thus increase imaging throughput. In another example, the surface 32 of the object 30 faces away from the outer surface 27 of the vacuum window 29 (e.g., to reduce or minimize a radiation dose to the ROI 31).

X-Ray Source

As schematically illustrated by FIG. 2, in certain implementations, the x-ray source 20 comprises a vacuum chamber 21 containing a vacuum region 23 and an electron beam source 22 in the vacuum region 23. The x-ray source 20 further comprises electron optics 25 (e.g., electrodes) configured to direct at least some electrons from the electron beam source 22 into an electron beam 24 focused at the at least one x-ray target 28. For example, the electron beam source 22 and the electron optics 25 are configured to generate the focused electron beam 24 and to bombard the at least one x-ray target 28 with the focused electron beam 24 with a selectable maximum focused electron energy at the at least one x-tray target 28 in a range from 10 kVp to 250 kVp. In certain implementations, the vacuum chamber 21 comprises a vacuum sealed tube containing the electron beam source 22, electron optics 25, and the at least one x-ray target 28. In contrast to open-tube x-ray sources, the x-ray source 20 of certain implementations is not actively pumped.

The at least one x-ray target 28 is within the vacuum region 23 and configured to generate the diverging x-rays 60 in response to bombardment by the focused electron beam 24. The at least one x-ray target 28 comprises at least one x-ray generating material selected for its x-ray spectral production properties (e.g., characteristic x-ray energy) and/or other properties (e.g., atomic number Z; electron density) that affect the x-ray production capability of the at least one x-ray generating material. The at least one x-ray generating material can have a sufficiently high thermal conductivity to dissipate heat generated by the bombardment by electron beams 24 with high power. Examples of x-ray generating materials include but are not limited to: Cr, Fe, Co, Ni, Cu, W, Rh, Mo, Au, Pt, Ag, $SrB_6$, $LaB_6$, and $CeB_6$. As shown schematically by the insert of FIG. 2, the at least one x-ray target 28 can be affixed to (e.g., integrated with; a component of; in contact with) the vacuum window 29, the vacuum window 29 separating the vacuum region 23 from a non-vacuum region outside the x-ray source 20. The thickness of the at least one x-ray generating material along a direction substantially perpendicular to the outer surface 27 of the vacuum window 29 can be in a range of 0.1 micron to 15 microns (e.g., 0.1 micron to 10 microns) and the thickness of the vacuum window 29 in the direction substantially perpendicular to the outer surface 27 of the vacuum window 29 can be in a range of 0.05 millimeter to 3 millimeters. As described herein, the thickness of the at least one x-ray generating material can be configured to optimize for high spatial resolution (e.g., by minimizing electron beam scatter inside material) and/or for high system throughput (e.g., maximizing electron energy deposition inside the at least one x-ray generating material). For example, the thickness of the at least one x-ray generating material can be less than twice the image resolution along the rotation axis 19. In certain implementations, the at least one x-ray generating material has a plurality of regions that can be bombarded by the electron beam 24 (e.g., by translating the electron beam focus), each region having a corresponding thickness along a direction substantially perpendicular to the outer surface 27 of the vacuum window 29. The electron beam 24 can be directed by the electron optics 25 to bombard a selected region with a corresponding thickness that provides a selected tradeoff between throughput and resolution.

In certain implementations, the vacuum window 29 consists essentially of atomic elements having atomic numbers (Z) less than 14 and is substantially transmissive to higher energy x-rays generated by the at least one x-ray generating material. For example, the vacuum window 29 can have a sufficiently high thermal conductivity to provide a thermal conduit to prevent thermal damage (e.g., melting) of the at least one x-ray generating material (e.g., one or more materials selected from the group consisting of: beryllium, diamond, boron carbide, silicon carbide, aluminum, and beryllium oxide (BeO)). The vacuum window 29 can further provide a sufficiently electrically conductive path to dissipate electric charge from the at least one x-ray generating material and/or the vacuum window 29. In certain implementations, the vacuum window 29 is configured to have an x-ray transmission such that more than 50% of the x-rays generated by the at least one x-ray source 28 having energies greater than one-half the selected maximum focused electron energy are transmitted through the vacuum window 29. In certain implementations, the diverging x-rays 60 emitted from the outer surface 27 of the vacuum window 29 are not obstructed by the x-ray source 20 along the x-ray propagation axis 10. While the x-ray source 20 emits x-rays into a solid angle of 4π, FIG. 2 schematically illustrates only the diverging x-rays 60 propagating along the x-ray propagation axis 10 within the angular divergence angle 12 to the at least one active element 52 of the at least one position-sensitive x-ray detector 50 (e.g., the x-rays contributing to image formation), with the other diverging x-rays generated by the at least one x-ray target 28 and emitted in other directions from the outer surface 27 of the vacuum window 29 not illustrated in FIG. 2.

In certain implementations, the system 5 further comprises a thermal cooling mechanism configured to reduce heating of the object 30 by heat produced by the x-ray source 20. For example, the thermal cooling mechanism can comprise an infrared (IR) reflective material (e.g., a thin IR reflective and highly x-ray transmissive film or layer, an example of which is aluminized mylar) between the vacuum window 29 and the object 30. The IR reflective material is configured to reflect heat generated by the x-ray source 20 (e.g., due to power of the electron beam being converted to heat in the at least one x-ray target 28) from reaching the object 30 and the sample mount 85 (e.g., directing the thermal energy away from the object 30 and the sample mount 85 to reduce or minimize heat transport to the object 30 and/or the sample mount 85). In this way, the IR reflective material can protect the object 30 and the sample mount 85 from changes in temperature of the sample that could otherwise cause thermal expansion that could deleteriously affect the accuracy of ROI selection and/or 3D volume reconstruction fidelity. The IR reflective material is sufficiently thin (e.g., thickness less than 1500 microns; thickness less than 100 microns) so as to not substantially impair the positioning of the object 30 close to the electron beam focus of the x-ray source 20.

In certain implementations, the x-ray source 20 comprises a grounded anode transmission x-ray source (e.g., with the vacuum housing electrically grounded), examples of which include but are not limited to: DAGE BrightHawk® x-ray source available from Nordson Corporation of Westlake, Ohio; L10711-03 microfocus x-ray source available from Hamamatsu Photonics K.K. of Hamamatsu City, Japan; Excillum Nanotube N1 and N2 x-ray sources available from Excillum Corporation of Kista Sweden; X-ray Worx GmbH of Garbsen, Germany; x-ray sources available from COMET Technologies of San Jose, California). These example x-ray sources 20 can be configured to have an x-ray source point integrated with the vacuum window 29 and to have an object 30 placed close to the x-ray source 20 to reduce (e.g., minimize) the FOD and therefore to increase (e.g., maximize) the x-ray flux at the object 30. Due to the electrical and mechanical constraints, the x-ray source 20 can have a large flat face which is the terminus of the vacuum envelope and is co-planar with the vacuum window 29 but cannot be made smaller without interfering with the quality of the electron beam focus. For previously-existing x-ray tomography and laminography imaging techniques utilizing such x-ray sources 20, this large flat face has restricted the ability to place a large and/or planar object 30 close to the x-ray source 20 and being able to rotate the object 30 (e.g., up to 180 degrees) around a rotation axis 19 substantially perpendicular to the large flat face. Certain implementations described herein advantageously circumvent this major drawback of previously-existing x-ray imaging systems.

In certain implementations, the x-ray source 20 is configured to have a small x-ray spot size (e.g., having a dimension of less than 7 microns in at least one lateral direction substantially parallel to the outer surface 27 of the vacuum window 29) while generating sufficient x-ray flux to facilitate sufficiently short image collection times. In general, the x-ray spot size is approximately equal to a convolution of the focused electron beam spot size (e.g., radius) at the at least one x-ray target 28 and the size (e.g., radius) of the x-ray generation volume inside the at least one x-ray target 28 due to scattering of the electrons inside the at least one x-ray target 28. Thus, larger focused electron beam spot sizes can facilitate higher electron beam powers, with concomitant higher x-ray flux and shorter image acquisition times, at the expense of lower spatial resolutions, and smaller focused electron beam spot sizes can facilitate higher spatial resolutions at the expense of lower x-ray flux and longer image acquisition times. In addition, since a large fraction (e.g., about 99%) of the incident power from the focused electron beam 24 is converted into heat in the at least one x-ray target 28, it can be desirable to limit the incident electron beam power, which typically decreases linearly with the x-ray spot dimension.

Figure 3A:
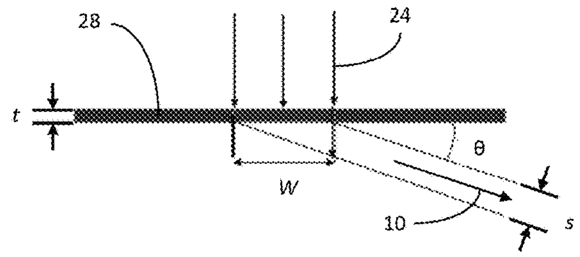
FIG. 3A schematically illustrate a cross-sectional view of an x-ray spot generated by an electron beam impinging at least one x-ray target in accordance with certain implementations described herein.
Figure 3B:
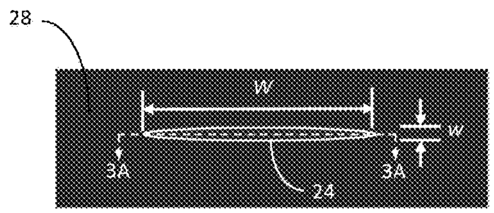
FIGS. 3B and 3C schematically illustrate top views of two example configurations the electron beam and the at least one x-ray target of FIG. 3A in accordance with certain implementations described herein.
Figure 3C:
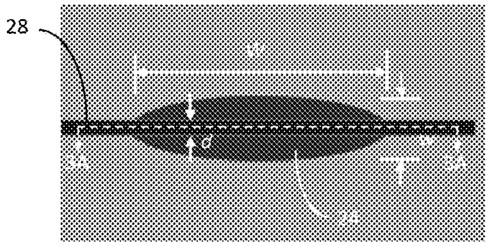

In certain implementations, higher spatial resolution of x-ray transmission images in the direction of the plane containing the surface normal of the outer surface 27 of the vacuum window 29 and the rotation axis 19 is provided by reducing a thickness t of the at least one x-ray generating material of the at least one x-ray target 28, which reduces the effective x-ray source size s. For example, the thickness t of the at least one x-ray generating material along a direction substantially perpendicular to the outer surface 27 of the vacuum window 29 can be in a range of 0.1 micron to 15 microns. FIG. 3A schematically illustrate a cross-sectional view of an x-ray spot generated by an electron beam 24 impinging at least one x-ray target 28 in accordance with certain implementations described herein. FIGS. 3B and 3C schematically illustrate top views of two example configurations the electron beam 24 and the at least one x-ray target 28 of FIG. 3A in accordance with certain implementations described herein. As schematically illustrated by FIG. 3A, the x-ray spot size viewed along the x-ray propagation axis 10 can be smaller than the width W (e.g., diameter) of the electron beam 24 on the x-ray target 28. For an x-ray generating material with a thickness t, the full-width-at-half maximum (FWHM) effective width s of the x-ray spot viewed along the x-ray propagation axis 10 can be approximately less than t/2 (FIG. 3A is not to scale). In certain implementations, the at least one x-ray generating material comprises a thin high Z material layer (e.g., thickness t in a range of 0.1 micron to 3 microns) on or inside of a low Z material substrate (e.g., vacuum window 29) to achieve a small x-ray spot size (e.g., less than 5 microns) in the cross-sectional plane of FIG. 3A along the x-ray propagating axis 10 with angles smaller than 30 degrees with respect to the outer surface 27 of the vacuum window 29. The FWHM effective width s of the x-ray spot size in the cross-sectional plane can be approximately equal to $s=\{(t/2)^2+[W\cdot\sin(\theta)]^2\}^{0.5}$, where t is the thickness of the high Z material, and W is the FWHM width of the electron beam size in the cross-sectional plane. For example, with t=1 micron, θ=10 degrees, and W=1 micron, the FWHM effective width s of the x-ray spot size in the cross-sectional plane is 0.53 micron, which is smaller than W. Thus, the effective x-ray source size in the cross-sectional plane along the x-ray propagation axis 10 can be compressed as compared to the width of the electron beam 24 in the cross-sectional plane.

With the effective x-ray spot size in the cross-sectional plane substantially smaller than the electron beam width W, certain implementations can further achieve a small x-ray spot size in a direction substantially perpendicular to the cross-sectional plane of FIG. 3A. For example, as schematically illustrated by FIG. 3B, the electron beam 24 can be focused to be compressed in the direction substantially perpendicular to the cross-sectional plane. A focused electron beam 24 having an elongated (e.g., rectangular) shape or footprint at the x-ray target 28 can have a long dimension (e.g., FHWM width W) in the cross-sectional plane of FIG. 3A and a short dimension (e.g., FWHM width w) in a direction (e.g., in a plane containing the x-ray propagation axis 10 and the surface normal of the outer surface 27 of the vacuum window 29) substantially perpendicular to the cross-sectional plane of FIG. 3A, the short dimension smaller than the long dimension.

For another example, as schematically illustrated by FIG. 3C, the width d of the high Z material of the at least one x-ray generating material in the direction substantially perpendicular to the cross-sectional plane of FIG. 3A can be smaller than the FWHM width w of the focused electron beam 24 in the direction substantially perpendicular to the cross-sectional plane of FIG. 3A. Since the at least one x-ray generating material generates x-rays more efficiently than does the vacuum window 29 (e.g., since x-ray production efficiency is approximately proportional to the mean atomic number of the material), the portions of the electron beam 24 that do not impinge the at least one x-ray generating material do not efficiently generate x-rays and do not substantially contribute to the x-ray spot size, thereby limiting the x-ray spot size to the width d in the direction substantially perpendicular to the cross-sectional plane of FIG. 3A. In certain implementations, the width d of the at least one x-ray generating material is in a range of 0.1 micron to 5 microns.

When viewed along the x-ray propagation axis 10 (e.g., the direction from the at least one position-sensitive x-ray detector 50), and taking into account the take-off angle between the outer surface 27 and the x-ray propagation axis 10, the x-ray spot of FIGS. 3B and 3C can appear square or circular at the at least one position-sensitive x-ray detector 50. For example, at a take-off angle of 10 degrees, an electron beam 24 having a rectangular focus with a 5:1 aspect ratio can appear substantially symmetric. Since the electron beam 24 is elongated and impinges a larger area than if the electron beam 24 were narrowly focused in both directions, a higher electron power can be used to increase the x-ray flux (e.g., to achieve a higher x-ray brightness) and thus reduce image collection times while maintaining spatial resolution. For example, an electron beam 24 with the 5:1 aspect ratio can provide up to a five-fold increase of the apparent power density. Further reducing the take-off angle in conjunction with a higher aspect ratio focused electron beam can facilitate further improvements of the apparent power density. Further reducing the take-off angle in conjunction with a higher aspect ratio focused electron beam can facilitate further improvements of the apparent power density. Certain implementations provide a higher spatial resolution in the cross-sectional plane of FIG. 3A than in the orthogonal direction to the cross-sectional plane. For many applications, high depth resolution (e.g., in a direction substantially perpendicular to the surface 32 of a laterally extended object 30) is more important than the lateral resolution (e.g., imaging delamination of the solder bumps or stress-induced cracks in solder bumps parallel to the surface in semiconductor packages).

Aperture

Figure 4:
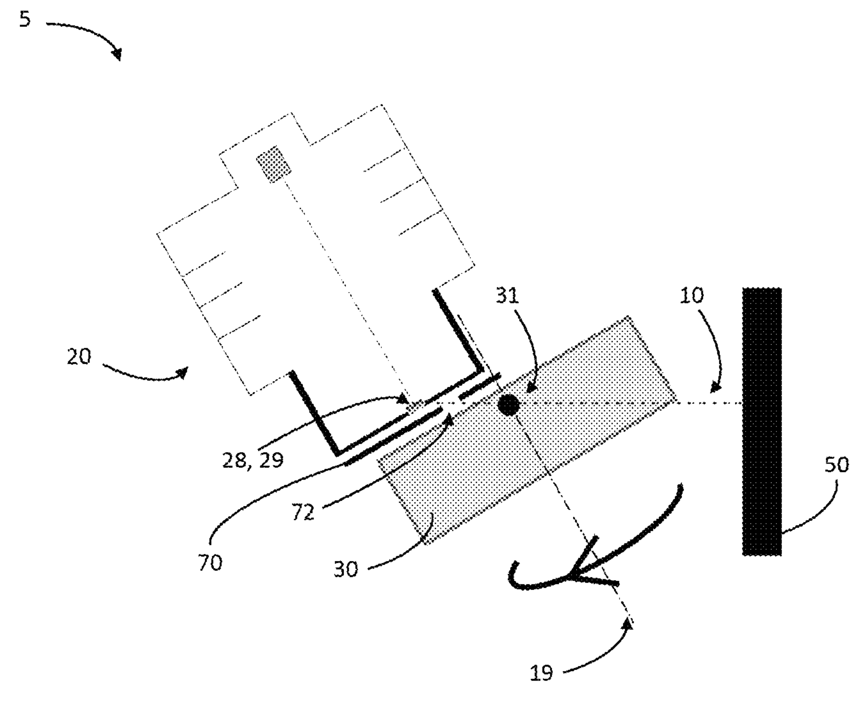
FIG. 4 schematically illustrates another example system comprising at least one aperture in accordance with certain implementations described herein.

FIG. 4 schematically illustrates another example system 5 comprising at least one aperture 70 in accordance with certain implementations described herein. In certain implementations, the at least one aperture 70 comprises at least one orifice 72 (e.g., slit; having a width less than 100 microns) in at least one solid material (e.g., plate), the at least one orifice 72 positioned on the x-ray propagation axis 10 and between the vacuum window 29 and the object 30 (e.g., downstream of the vacuum window 29 and upstream from the object 30). The at least one aperture 70 is configured to not attenuate the diverging x-rays 60 propagating along the x-ray propagating axis 10 within the angular divergence angle 12 (e.g., the x-rays used for imaging) from reaching the ROI 31 and/or the at least one position-sensitive x-ray detector 50 but to attenuate at least some x-rays emitted from the vacuum window 29 in other directions and/or scattered x-rays (e.g., the x-rays not used for imaging) from reaching the ROI 31 and/or the at least one position-sensitive x-ray detector 50. In certain implementations, the at least one solid material of the at least one aperture 70 has a sufficiently high Z (e.g., W; Au), sufficiently high electron density, and a substantially small thickness such that the at least one aperture 70 is configured to attenuate x-rays without substantially limiting the FOD. In certain implementations, the at least one aperture 70 is configured to attenuate the amount of extraneous x-ray flux outside the angular divergence angle 12 emitted by the x-ray source 20 reaching the object 30. By attenuating this extraneous x-ray flux, the at least one aperture 70 can reduce a deleterious background contribution in the image from the extraneous x-ray flux and/or can reduce the detrimental x-ray dosage to the object 30 from the extraneous x-ray flux that does not contribute to the imaging. The edges of the at least one orifice 72 of the at least one aperture 70 can define the angular divergence angle 12 by only allowing x-rays within the at least one orifice 72 to propagate further along the x-ray propagation axis 10. In certain implementations, the distance between the one aperture 70 to the vacuum window 29 is configured (e.g., a distance in a range from 0.3 millimeter to 5 millimeters) to achieve a small FOD between the x-ray source point and the ROI 31.

Sample Motion Stage and Sample Mount

In certain implementations, the at least one sample motion stage 80 is configured to move the object 30 relative to the x-ray source 20 and/or the at least one position-sensitive x-ray detector 50. In certain implementations, the at least one sample motion stage 80 comprises at least one linear motion substage 82 configured to controllably adjust a position of the object 30 (e.g., along substantially perpendicular x-, y-, and z-directions) and at least one rotational motion substage 84 configured to controllably adjust an orientation of the object 30 (e.g., rotating the object 30 about the rotation axis 19). For example, the at least one linear motion substage 82 can comprise one, two, or three electromechanical linear motion driver (e.g., linear motor; stepper motor; motor with encoder; piezoelectric motor; rotary motor with screw) configured to move the object 30 such that the ROI 31 is at a selected position along the x-ray propagation axis 10 and the at least one rotational motion substage 84 can comprise at least one electromechanical motion driver (e.g., rotary motor; stepper motor; motor with encoder; linear motion driver with worm drive) configured to rotate the object 30 and the ROI 31 about the rotation axis 19.

In certain implementations, as schematically illustrated by FIG. 2, a laterally extended object 30 can be mounted on the at least one sample motion stage 80, such that a surface 32 of the object 30 parallel to a long dimension of the object 30 is tilted at an angle β (e.g., in a range of 1 degree to 30 degrees) with respect to the x-ray propagation axis 10. In certain implementations, the at least one rotational motion substage 84 is further configured to controllably adjust the angle β and the at least one linear motion substage 82 is further configured to linearly translate the object 30 and/or the at least one rotational motion substage 84 such that the ROI 31 is positioned on the rotation axis 19, as well as on the x-ray propagation axis 10. In certain implementations, the at least one sample motion stage 80 is configured to controllably adjust the distance between the rotation axis 19 and the x-ray spot (e.g., the electron beam focus).

In certain implementations, the sample mount 85 is configured to hold the object 30 while the object 30 is irradiated by the x-rays 60 such that the x-rays 60 are transmitted through the ROI 31 to the at least one position-sensitive x-ray detector 50. The sample mount 85 is configured such that the x-rays 60 minimally interact with (e.g., are minimally scattered and/or absorbed by) solid components of the at least one sample motion stage 80 (e.g., the at least one linear motion substage 82 and the at least one rotational motion substage 84). The sample mount 85 is configured to reduce (e.g., minimize) the portion of the diverging x-rays 60 that interact with solid portions of the at least one sample motion stage 80 as the object 30 is rotated around the rotation axis 19.

In certain implementations, the at least one sample motion stage 80 and the sample mount 85 are configured to hold and rotate the object 30 without compromising throughput. For example, since throughput for microfocus transmission x-ray computed laminography is inversely proportional to the square of the focus-to-object distance (FOD), high throughput can be achieved using a small FOD (e.g., having the object 30 as close as possible to the x-ray source 20).

Figure 5A:
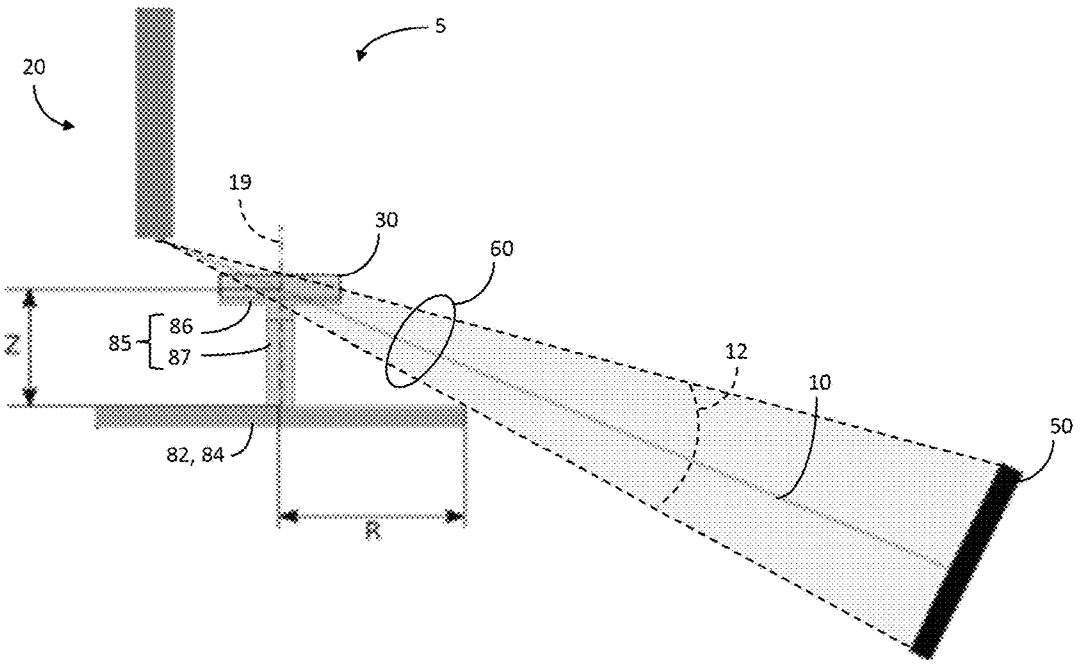
FIGS. 5A and 5B schematically illustrate example systems in which the sample stage and the sample mount are configured to hold and rotate the object in accordance with certain implementations described herein.
Figure 5B:
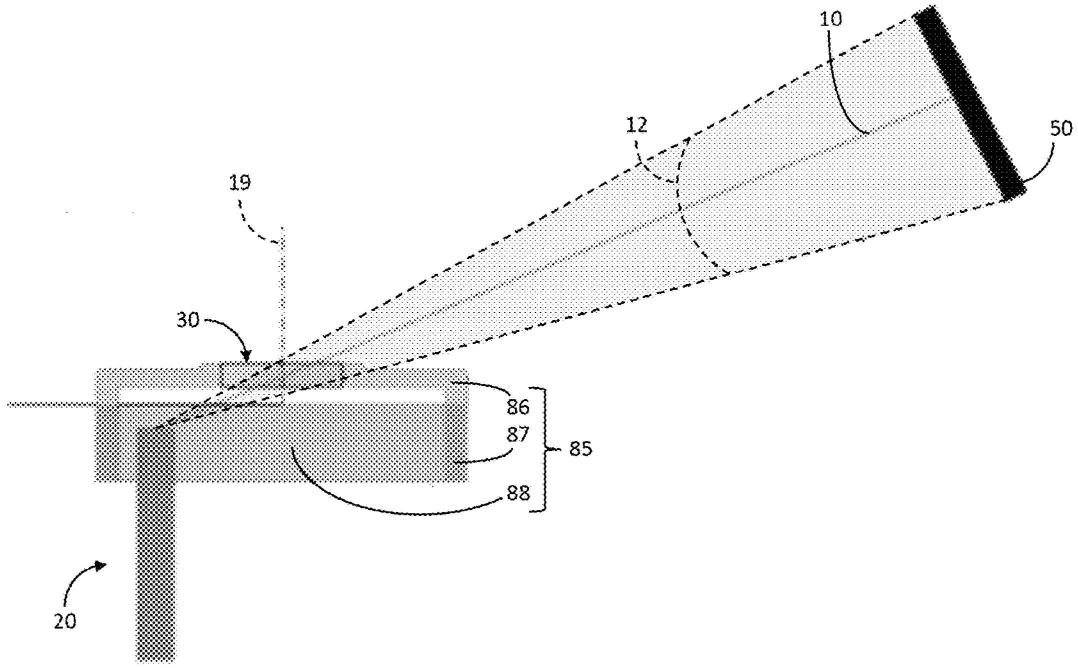

FIGS. 5A and 5B schematically illustrate example systems 5 in which the at least one sample motion stage 80 and the sample mount 85 are configured to hold and rotate the object 30 in accordance with certain implementations described herein. In the example system 5 of FIG. 5A, the object 30 is between the x-ray source 20 and the at least one sample motion stage 80. With the at least one linear motion substage 82 and the at least one rotational motion substage 84 on an opposite side of the object 30 from the at least one x-ray source 20, the at least one sample motion stage 80 does not impede the x-rays 60 reaching the object 60. However, as shown in FIG. 5A, after having propagated through the ROI 31, the x-rays 60 propagate through at least a portion of the sample mount 85 before reaching the at least one position-sensitive x-ray detector 50. In the example system 5 of FIG. 5B, the x-ray source 20 and the at least one sample motion stage 80 are on the same side of the object 30 and the x-rays 60 propagate through at least a portion of the sample mount 85 before reaching the object 30 (e.g., the sample mount 85 can limit the closest approach of the x-ray source 20 to the object 30). While FIG. 5A shows an example implementation in which the x-ray source 20 is above the object 30 and the at least one sample motion stage 80, in other implementations, the x-ray source 20, the object 30, and the at least one sample motion stage 80 can have any orientation while retaining the same relative positioning to one another. While FIG. 5B shows an example implementation in which the x-ray source 20 is below the object 30, in other implementations, the x-ray source 20, the object 30, and the at least one sample motion stage 80 can have any orientation while retaining the same relative positioning to one another.

In certain implementations, the sample mount 85 is configured to offset the object 30 from the at least one sample stage 80 so that the at least one sample stage 80 (e.g., the at least one linear motion substage 82 and the at least one rotational motion substage 84) is not in the imaging field-of-view of the at least one position-sensitive x-ray detector 50 (e.g., reduce, avoid, or minimize x-ray scattering and/or absorption that would deleteriously affect the image reconstruction fidelity). For example, the sample mount 85 can offset the object 30 from the at least one sample stage 80 by a distance that is greater than 50 millimeters (e.g., greater than 100 millimeters; in a range of 100 millimeters to 500 millimeters; in a range of 100 millimeters to 200 millimeters). The sample mount 85 of certain implementations comprises a first portion 86 configured to be impinged by at least a portion of the x-rays 60 as the object 30 and the sample mount 85 are rotated about the rotation axis 19 and a second portion 87 that mechanically couples the first portion 86 to the at least one motion substage (e.g., the at least one linear motion substage 82 and/or the at least one rotational motion substage 84). The first portion 86 and the second portion 87 are configured to offset the ROI 31 of the object 30 from the at least one motion substage such that the diverging x-rays 60 do not impinge the at least one motion substage or the second portion 87 (e.g., as the object 30 and the sample mount 85 are rotated about the rotation axis 19).

In certain implementations, the first portion 86 is comprised essentially of low Z elements (e.g., atomic elements having atomic numbers less than 14) and/or thin materials (e.g., thickness along the rotation axis 19 less than 10 millimeters). In certain implementations, the first portion 86 has an x-ray transmission greater than 50% for x-rays having energies greater than 50% of the maximum x-ray energy of the x-ray spectrum of the x-rays 60 (e.g., the x-rays emitted by the x-ray source 20). Certain such implementations concurrently provide a sufficiently high throughput with a sufficiently small amount of radiation damage to the object 30 (e.g., since the x-rays do not have to be transmitted through absorptive material of the at least one sample motion stage 80, the x-ray flux irradiating the object 30 can be kept sufficiently low to avoid radiation damage while providing sufficiently high amounts of detected x-rays for high throughput imaging). For example, the first portion 86 can comprise a carbon fiber or quartz plate (e.g., having a projected thickness along the x-ray propagation axis 10 less than or equal to 2 millimeters). The second portion 87 is mechanically coupled to the first portion 86 and to the at least one linear motion substage 82 and/or the at least one rotational motion substage 84. In certain implementations, the second portion 87 is comprised essentially of the same low Z elements and/or thin materials as is the first portion 86 (e.g., low Z rod or hollow tube, such as a carbon fiber or quartz tube having a projected thickness along the x-ray propagation axis 10 less than or equal to 2 millimeters), while in certain other implementations, the second portion 87 comprises any solid material (e.g., regardless of the x-ray absorption and/or scattering of the solid material). In certain implementations, the second portion 87 is part of the at least one linear motion substage 82 and/or the at least one rotational motion substage 84.

For example, as schematically illustrated by FIG. 5A, the first portion 86 and the second portion 87 extend along the rotation axis 19 and can be configured such that for all laminography angles of interest and for all rotational angles of interest, the x-rays 60 do not impinge the at least one linear motion substage 82 and/or the at least one rotational motion substage 84. For the at least one sample motion stage 80 having a maximum dimension (e.g., radius) R from the rotation axis 19 and along a direction substantially perpendicular to the rotation axis 19, the first and second portions 86, 87 can be configured to hold the object 30 a distance z along the rotation axis 19 from the at least one linear motion substage 82 and/or the at least one rotational motion substage 84 such that the envelope of x-rays 60 does not impinge portions of the at least one sample motion stage 80 that would scatter and/or absorb the x-rays 60 (e.g., portions comprising at least one element having an atomic number Z greater than 14; the at least one linear motion substage 82; the at least one rotational motion substage 84).

For another example, as schematically illustrated by FIG. 5B, the first portion 86 is configured to hold (e.g., clamp) the sides and/or edges of the object 30 and the second portion 87 mechanically couples the first portion 86 to the at least one sample motion stage 80 (not shown in FIG. 5B). The at least one sample motion stage 80 of FIG. 5B further comprises a clear aperture region 88 (e.g., a region at least partially bounded by the second portion 87) configured to have the x-ray source 20 extending at least partially therethrough. Certain such implementations enable the x-ray source 20 to be placed arbitrarily close to a face of the object 30, thereby providing a high throughput while rigidly mounting the object 30. An example second portion 87 compatible with certain implementations described herein is a large aperture, ultra-high-precision, air-bearing rotary stage, available from PI (Physik Instrumente) of Auburn, Massachusetts.

Image reconstruction fidelity is dependent on precise rotation of the object 30 during measurements, and uncontrolled motions of the object 30 can create deviations of the actual recorded projection data from what a laminographic reconstruction algorithm would expect. As a result, these uncontrolled motions can create a blurring in the back-projected data that degrades the resolution and contrast in the reconstructed volume. In certain implementations, the at least one sample motion stage 80 reduces (e.g., avoids; minimizes) deviations from pure rotations that cause translation and/or orientation changes of the object 30 within the image field-of-view. The at least one sample motion stage 80 can have a sufficiently low non-systematic angular wobble (e.g., uncontrolled angular motion of the rotation axis 19 as a function of rotation about the rotation axis 19), sufficiently low radial runout (e.g., uncontrolled translation of the rotation axis 19 as a function of rotation about the rotation axis 19 resulting in lateral movement of the object 30 substantially perpendicular to the rotation axis 19), and/or sufficiently low axial runout (e.g., uncontrolled axial movement of the object 30 substantially parallel to the rotation axis 19) during rotation of the object 30 about the rotation axis 19 such that uncontrolled motion of the object 30 is less than one-fifth of the system resolution (e.g., less than 0.1 micron uncontrolled motion for a system resolution of 0.5 micron). For example, for an object 30 positioned a distance L above the at least one rotational motion substage 84 of the at least one sample motion stage 80 and an image resolution (e.g., detector resolution divided by image magnification) of $\delta$, a non-systematic angular wobble of $\omega$ (e.g., less than 100 nanoradians; less than 200 nanoradians; less than 1 microradian; less than 5 microradians) can result in a radial runout of $R=\omega L<\delta/5$ (e.g., less than $\delta/3$; less than $\delta/2$; less than 1 micron; less than 0.5 micron; less than 200 nanometers; less than 100 nanometers) and/or an axial runout $A<\delta/5$ (e.g., less than $\delta/3$; less than $\delta/2$; less than 1 micron; less than 0.5 micron; less than 200 nanometers; less than 100 nanometers). In certain implementations, the at least one sample motion stage 80 has a non-systematic angular wobble (e.g., error) less than 5 microradians (e.g., less than 1 microradian), a radial runout repeatability better than 1000 nanometers, and an axial runout repeatability better than 1000 nanometers. In certain implementations, the system 5 further comprises a metrology system configured to measure an angular wobble of the at least one sample motion stage 80 with an accuracy better than less than 5 microradians (e.g., less than 1 microradian), to measure a radial runout of the at least one sample motion stage 80 with an accuracy better than 1000 nanometers, and/or to measure an axial runout of the at least one sample motion stage 80 with an accuracy better than 1000 nanometers.

In certain implementations, the at least one rotational motion substage 84 of the at least one sample motion stage 80 can comprise an air-bearing rotary stage (e.g., A-62X or A-688 rotary stage available from PI (Physik Instrumente of Auburn, Massachusetts; ABRX00, ABRX150, or ABRX250 rotary stage available from Aerotech, Inc. of Pittsburgh, Pennsylvania) having a wobble angle less than 5 microradians (e.g., less than 1 microradian; less than 200 nanoradians) and radial and axial runout less than 100 nanometers. The position of the object 30 over the angular range (e.g., 360 degrees) of rotation about the rotation axis 19 can be accurate to better than one-half of the resolution of the system.

Position-Sensitive x-Ray Detector

In certain implementations, the at least one position-sensitive x-ray detector 50 is configured to record images of the x-rays 60 received after transmitting through the ROI 31. Examples of the at least one position-sensitive x-ray detector 50 include but are not limited to: photon counting detectors (e.g., comprising silicon, CdTe, and/or CdZnTe and configured to directly convert x-rays to electrons with or without energy discrimination; Eiger ASICs and Pilatus ASICs available from Dectris of Baden-Daettwil, Switzerland); flat panel detectors (FPD) comprising a scintillator material (e.g., $CdWO_4$, CsI, $Gd_2O_2S$, LSO, GAGG, and/or LYSO; Shad-o-Box HS detectors available from Teledyne Dalsa of Waterloo Canada; 2315N detectors available from Varex Imaging of Salt Lake City, Utah; Athena detectors and Onyx detectors available from Nordson Corporation of Westlake, Ohio; 1412HR detectors available from Spectrum Logic Corporation of Boulder, Colorado); fiber optic plates and CMOS or CCD detectors; a scintillator material (e.g., $CdWO_4$, CsI, $Gd_2O_2S$, LSO, GAGG, and/or LYSO) and objective configured to magnify an image onto a CMOS or CCD detector. In certain implementations, the at least one position-sensitive x-ray detector 50 comprises a plurality of active elements 52 (e.g., pixels) having lateral dimensions (e.g., along a surface of the detector 50) less than 70 microns (e.g., less than 50 microns).

In certain implementations, the at least one position-sensitive x-ray detector 50 is configured to receive and image x-rays 60 transmitted through the object 30, including the ROI 31, the x-rays 60 having a predetermined range of energies (e.g., the x-ray spectrum) which facilitates (e.g., optimize) sufficient image contrast to discern features of interest in the ROI 31 and/or reduces imaging collection times. For example, the predetermined x-ray spectrum can be generated by selecting the focused electron energy and/or the at least one x-ray generating material of the at least one x-ray target 28, such that the generated x-rays 60 in the predetermined x-ray spectrum have a sufficiently large x-ray flux to facilitate the image contrast and/or the imaging collection times. For x-ray imaging using absorption contrast, the predetermined x-ray spectrum can include energies at which the object 30 has an x-ray transmission in a range of 5% to 85% (e.g., in a range of 8% to 30%). This range of x-ray transmission can provide an advantageous trade-off between image contrast (which favors lower energy x-rays) and transmission through the object 30 (which favors higher energy x-rays).

For another example, the at least one position-sensitive x-ray detector 50 can be configured to have at least one energy threshold for detecting x-rays (e.g., the at least one position-sensitive x-ray detector 50 can be configured to reject and/or suppress detection of x-rays having energies below a first energy threshold and/or energies above a second energy threshold). For example, the at least one energy threshold can comprise a threshold cut-off x-ray energy, the at least one position-sensitive x-ray detector 50 configured to only image x-rays having energies below the threshold cut-off x-ray energy. The threshold cut-off x-ray energy of certain implementations corresponds to x-rays for which the object 30 has an x-ray transmission less than 85% (e.g., less than 50%). For example, the at least one position-sensitive x-ray detector 50 can comprise a photon counting detector configured to select at least one threshold cut-off x-ray energy (e.g., to controllably adjust the threshold cut-off x-ray energy). The photon counting detector can be further configured to collect energy-dependent x-ray transmission images (e.g., using a plurality of operator-selectable energy windows to reduce noise, image artifacts, and/or to provide material differentiation). For another example, the at least one position-sensitive x-ray detector 50 can comprise a combination of scintillating screens and materials configured to only image x-rays below the threshold cut-off x-ray energy.

Figure 6A:
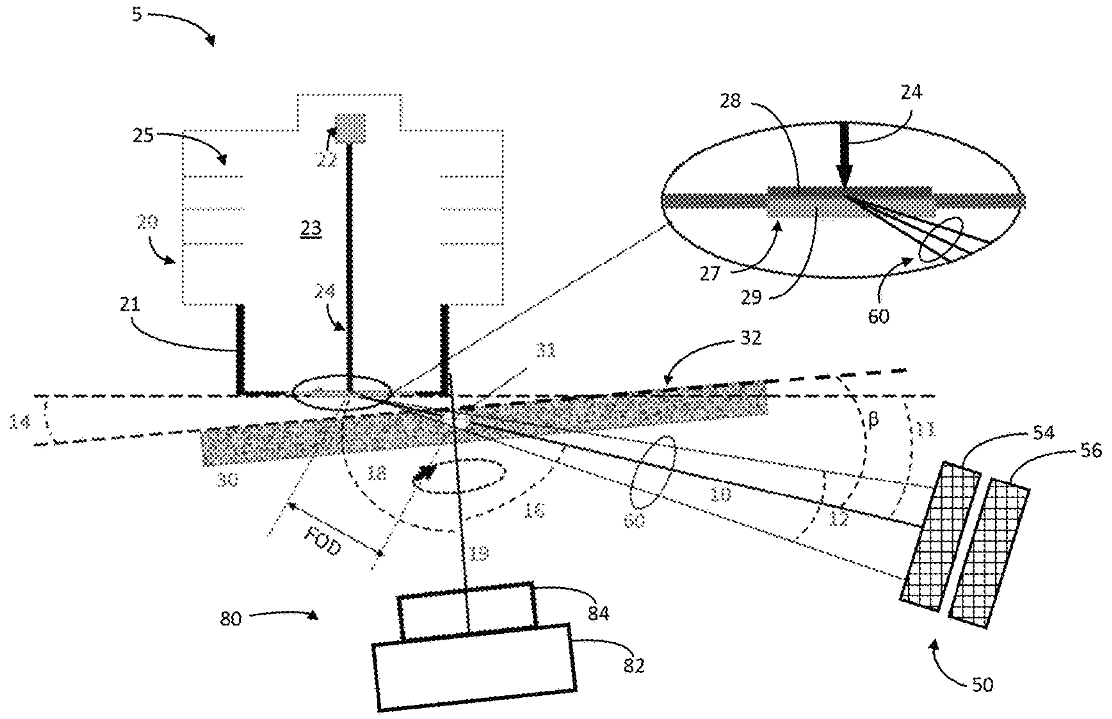
FIGS. 6A and 6B schematically illustrate two examples of a system in which the at least one position-sensitive x-ray detector comprises a first position-sensitive x-ray detector and a second position-sensitive x-ray detector in accordance with certain implementations described herein.
Figure 6B:
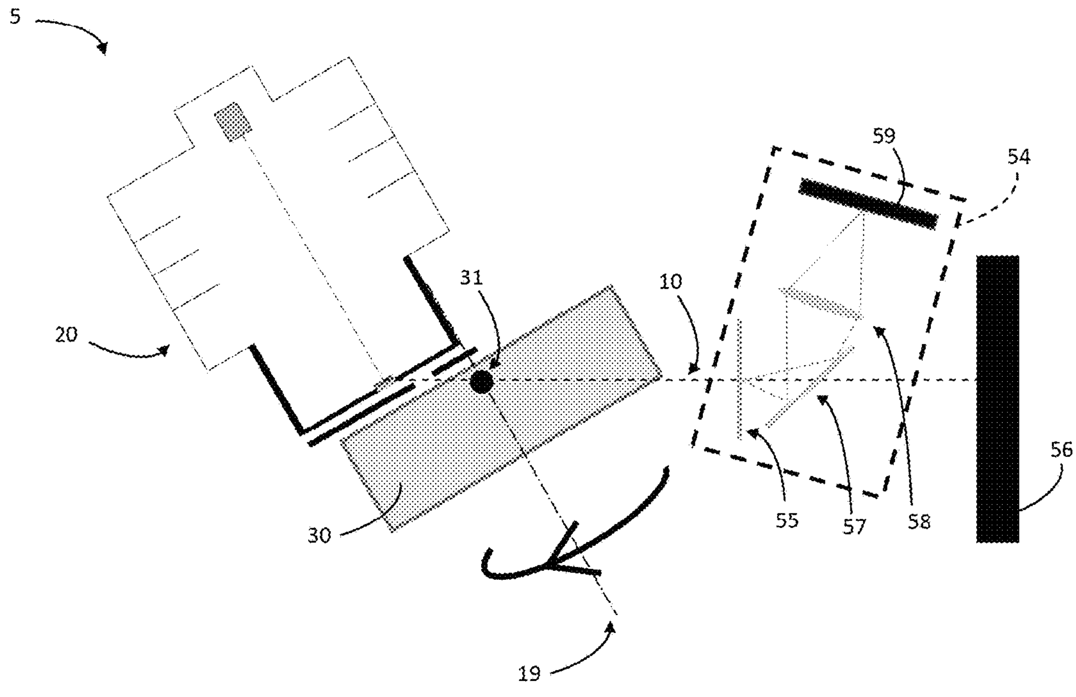

FIGS. 6A and 6B schematically illustrate two examples of a system 5 in which the at least one position-sensitive x-ray detector 50 comprises a first position-sensitive x-ray detector 54 and a second position-sensitive x-ray detector 56 in accordance with certain implementations described herein. The second position-sensitive x-ray detector 56 can be configured to provide gain sensitivity to a different portion of the x-ray spectrum than obtained from the first position-sensitive x-ray detector 54, to increase overall throughput, and/or to provide measurements with a different spatial resolution from that of the first position-sensitive x-ray detector 54. For example, the first and second position-sensitive x-ray detectors 54, 56 can have different scintillating materials from one another and/or different scintillator thicknesses from one another.

For example, as schematically illustrated by FIG. 6A, the first detector 54 can be configured to absorb and detect a first spectral portion of the x-rays 60 transmitted through the ROI 31 and the second detector 56 can be configured to absorb and detect a second spectral portion of the x-rays 60 transmitted through the ROI 31 and not absorbed by the first detector 54. The first detector 54 can be configured (e.g., optimized) for high resolution and can transmit at least some of the x-ray flux received from the ROI 31, and the second detector 56 can be positioned behind the first detector 54 (see, e.g., FIG. 6A) and configured to detect at least some of the x-ray flux transmitted through the first detector 56. For another example, as schematically illustrated by FIG. 6B, a first spectral portion of the x-rays 60 propagating along the x-ray propagation axis 10 can be absorbed by a scintillator screen 55 of the first detector 54 and a second spectral portion of the x-rays 60 propagating along the x-ray propagation axis 10 can be transmitted by the scintillator screen 55 to impinge the second detector 56. The x-rays absorbed by the scintillator screen 55 can generate scintillation photons (e.g., visible light photons) that are reflected by a mirror 57 and imaged by an objective lens 58 onto a position-sensitive photon detector 59. The material and thickness of the mirror 57 can be selected to have a high transmission of the x-rays 60 that are transmitted through the object 30.

While FIGS. 6A and 6B schematically illustrate configurations in which the two detectors 54, 56 are positioned to detect x-rays 60 propagating along the same direction as one another, in certain other implementations, the two detectors 54, 56 are positioned to collect x-rays propagating from the at least one x-ray source 20 along different directions from one another (e.g., different directions at angles less than 45 degrees relative to the outer surface 27 of the vacuum window 29). In certain implementations, the two detectors 54, 56 are used simultaneously with one another, while in certain other implementations, the two detectors 54, 56 are used separately (e.g., sequentially) from one another. In certain implementations, the two detectors 54, 56 are configured to have different pixel resolutions at the object 30 (e.g., approximately equal to the pixel size of the detector divided by its geometric image magnification). Combining the outputs of the two detectors 54, 56 in certain implementations can increase an overall detection efficiency of the system 5, and can give access to a broader range of object spatial frequencies, therefore improving throughput and reconstruction quality. In certain implementations, the second detector 56 is configured (e.g., optimized) to be sensitive to a different portion of the x-ray spectrum of the x-rays 60, which can allow correction for beam hardening and/or material identification.

Figure 7:
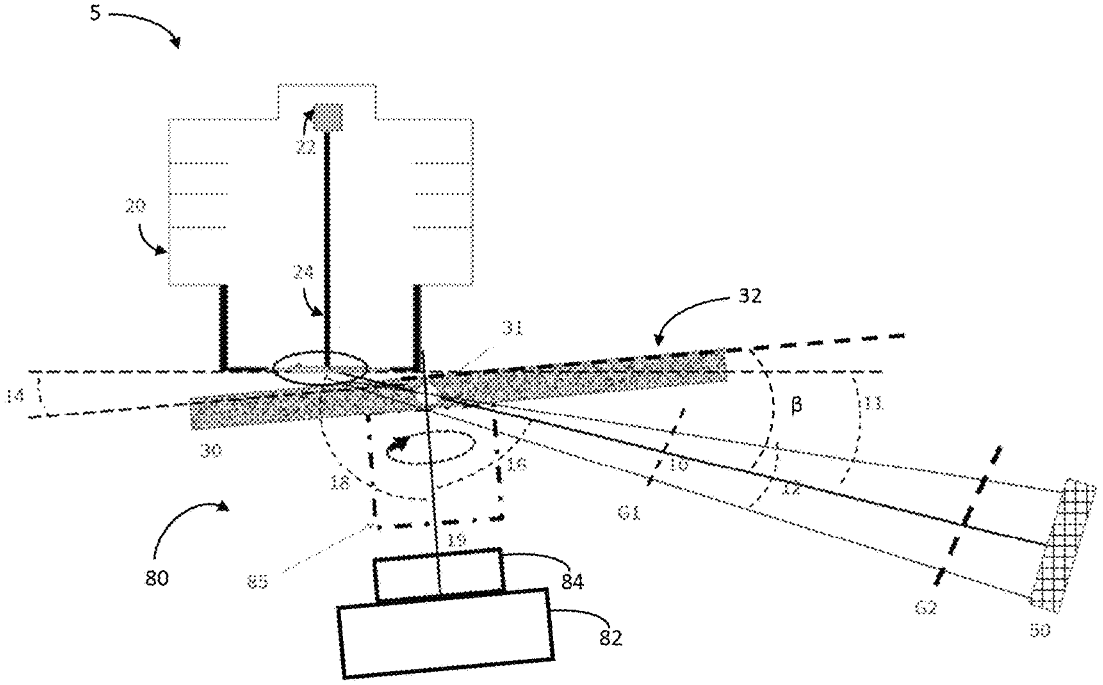
FIG. 7 schematically illustrates an example system configured to perform multi-contrast x-ray imaging using Talbot interferometry or Talbot-Lau interferometry in accordance with certain implementations described herein.

FIG. 7 schematically illustrates an example system 5 configured to perform multi-contrast x-ray imaging using Talbot interferometry or Talbot-Lau interferometry in accordance with certain implementations described herein. The system 5 can be configured to provide high resolution and sensitivity and unique imaging capabilities (e.g., absorption, phase, and darkfield image contrast in 2D and 3D; darkfield; enhanced absorption contrast imaging) for a wide range of applications. In certain implementations, the system 5 is configured to collect a 3D imaging dataset using Talbot-Lau interferometry, darkfield contrast, and enhanced absorption contrast, and to reconstruct the dataset to obtain 3D images of the object 30 and/or the ROI 31 in the object 30. In certain implementations, as schematically illustrated by FIG. 7, the system 5 further comprises at least one sample motion stage 80 and a sample mount 85 (see, e.g., FIG. 5A) configured to reduce (e.g., minimize) interactions of the portion of the diverging x-rays 60 propagating along the x-ray propagation axis 10 with solid portions of the at least one sample motion stage 80.

As schematically illustrated by FIG. 7, the system 5 comprises a first grating G1 (e.g., a phase grating) configured to generate a Talbot self-image interference pattern at a first position along the x-ray propagation axis 10 and a second grating G2 (e.g., an analyzer grating) positioned at a second position along the x-ray propagation axis 10. The first grating G1 and the second grating G2 are configured to be compatible with Talbot interferometry such that the Talbot pattern is imaged indirectly by the at least one position-sensitive x-ray detector 50. In certain other implementations, the second grating G2 can be omitted and the at least one position-sensitive x-ray detector 50 can have active elements 52 with spatial resolutions (e.g., sizes in lateral directions substantially perpendicular to the x-ray propagation axis 10) sufficiently small (e.g., smaller than or equal to one-half of the pitch of the second grating G2) to be compatible with Talbot interferometry such that the Talbot pattern is imaged directly by the at least one position-sensitive x-ray detector 50. In certain implementations, the system 5 further comprises a source grating and is configured to perform Talbot-Lau interferometry. In certain other implementations, the x-ray source 20 comprises a plurality of x-ray targets 28 in a regular array in one or two dimensions, the geometric parameters of the plurality of x-ray targets 28, first grating G1, and second grating G2 are configured to satisfy the Talbot-Lau interferometer conditions. Various configurations of the x-ray source 20, and the first and second gratings G1, G2 are disclosed in U.S. Pat. Nos. 9,719,947 and 10,349,908, each of which is incorporated in its entirety by reference herein.

In certain implementations, the first grating G1 comprises an absorption grating. For example, the one or both of the first grating G1 and the second grating G2 can comprise an array of patterned one-dimensional or two-dimensional x-ray substantially absorptive (e.g., absorption greater than 50%) structures having widths in a range of 0.5 micron to 20 microns and spaced from one another by substantially non-absorptive (e.g., absorption less than 50%) gaps having widths in a range of 0.5 micron to 20 microns. In addition to using a technique such as phase stepping for tri-contrast imaging (e.g., absorption, phase, and scattering), the system 5 of certain implementations can be configured to obtain only darkfield (e.g., scattering) contrast imaging by configuring the pitch, the distances from the x-ray source 20, and the alignments of the first and second gratings, such that the x-rays transmitted through the openings of the first (e.g., upstream) grating G1 are incident on absorbing portions of the second (e.g., downstream) grating G2. For example, the first grating G1 and the second grating G2 can be placed along the x-ray propagation axis 10 between the at least one x-ray source 20 and the at least one position-sensitive x-ray detector 50 (e.g., the first grating G1 closer to the at least one x-ray source 20 than to the at least one position-selective x-ray detector 50) such that the substantially non-absorptive structures of the second grating G2 are aligned with (e.g., in the shadows of) the substantially absorptive structures of the first grating G1 and that the substantially absorptive structures of the second grating G2 are aligned with the substantially non-absorptive structures of the first grating G1. In such a configuration, in the absence of an object 30, no x-rays would be expected to be transmitted through both the first grating G1 and the second grating G2, but in the presence of scattering features of an object 30, at least some of the scattered x-rays are transmitted through the second grating G2, leading to imaging of the features in the object 30 responsible for the scattered x-rays. In certain implementations, an enhanced absorption contrast image can be obtained by displacing the relative alignment of the first and second gratings by one-half the pitch from the configuration used in the darkfield imaging, such that the x-rays scattered by the object 30 are reduced by the absorbing structures of the second grating G2. In certain implementations, instead of having a second grating G2, a first set of the active elements 52 (e.g., pixels) of the at least one position-sensitive x-ray detector 50 are aligned with (e.g., in the shadows of) the substantially absorptive structures of the first grating G1 and a second set of the active elements 52 of the at least one position-sensitive x-ray detector 50 are aligned with the substantially non-absorptive structures of the first grating G1. In such a configuration, when the object 30 is placed along the x-ray propagation axis 10, the x-ray counts recorded by the second set of active elements 52 can be used to generate absorption contrast images while the x-ray counts recorded by the first set of active elements 52 can be used to generate scattered/darkfield and/or refraction images.

Figure 8:
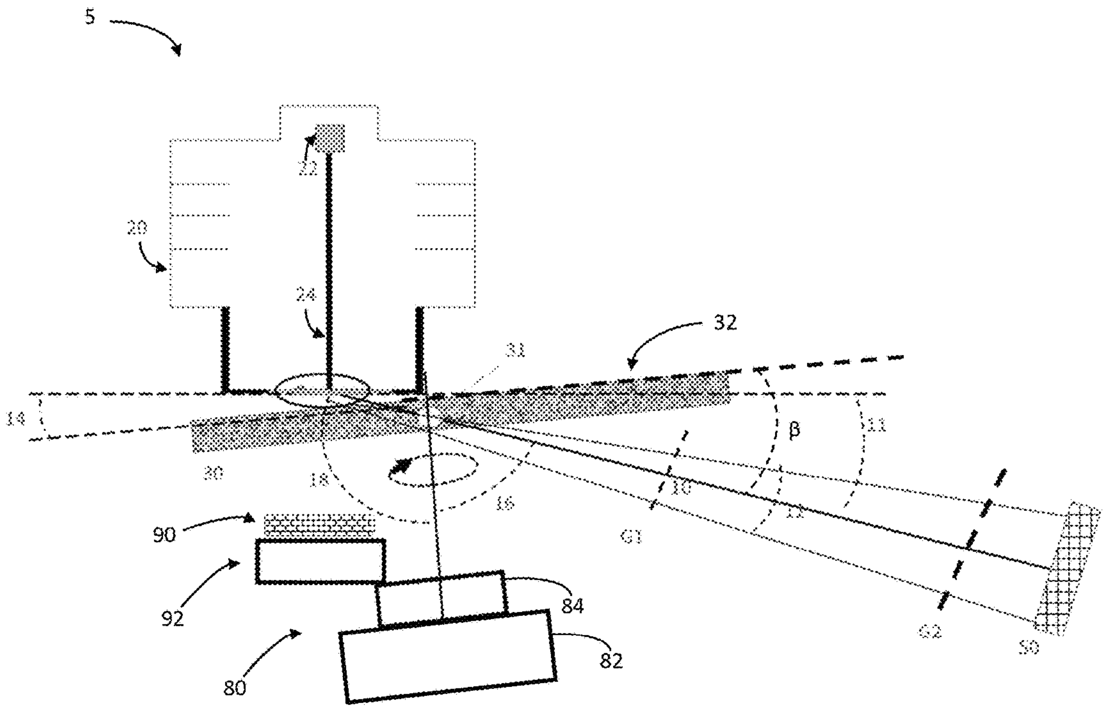
FIG. 8 schematically illustrates an example system compatible with generating a translation laminography image in accordance with certain implementations described herein.

In certain implementations in which semiconductor IC packages are to be imaged in 3D, the system 5 is configured to obtain x-ray transmission images with the x-ray propagation axis 10 at a small angle (e.g., in a range less than 45 degrees) with respect to the surface normal of the surface 32 of the semiconductor chip. For example, a rotation laminography over a large angular range (e.g., 180 degrees to 630 degrees) or a limited angle translation laminography over a finite angular range (e.g., ±30 degrees) can be performed. The 3D image(s) can be combined with the laminography 3D image obtained with the x-ray propagation axis 10 at a large angle (e.g., greater than 60 degrees) with respect to the surface normal of the surface 32 of the semiconductor chip to generate a 3D image. FIG. 8 schematically illustrates an example system 5 compatible with generating a translation laminography image in accordance with certain implementations described herein. The system 5 comprises an additional x-ray detector 90 and at least one detector stage 92 configured to translate the detector 90 and the object 30 with respect to the x-ray source 20. In certain implementations, the at least one detector stage 92 comprises the at least one sample motion stage 80. For example, the detector 90 and the object 30 can be moved in proportion in the same direction (e.g., along a line from the x-ray source 20 through the ROI 31 to the center of the detector 90). In certain implementations, the system 5 of FIG. 8 is configured to achieve higher spatial resolution and/or better image clarity for features extending in a direction substantially parallel to the surface normal of the semiconductor chip (e.g., side walls of copper interconnects).

In certain implementations, the system 5 further comprises at least one motion mechanism configured to vary a geometric magnification of an image of the region of interest of the object generated by the at least one position-sensitive detector. For example, the at least one motion mechanism can comprise at least one first motion stage (e.g., linear motion stage; electromechanical linear motion driver; linear motor; stepper motor; motor with encoder; piezoelectric motor; rotary motor with screw) configured to move the x-ray source 20 relative to the object 30, at least one second motion stage (e.g., linear motion stage; electromechanical linear motion driver; linear motor; stepper motor; motor with encoder; piezoelectric motor; rotary motor with screw) configured to move the at least one position-sensitive detector 50 relative to the object 30, and/or at least one third motion stage (e.g., linear motion stage; electromechanical linear motion driver; linear motor; stepper motor; motor with encoder; piezoelectric motor; rotary motor with screw; the at least one linear motion substage 82) configured to move the object 30 relative to the x-ray source 20 and/or the at least one position-sensitive detector 50.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An x-ray imaging system configured to generate images of a region of interest of an object, the system comprising:

at least one x-ray detector comprising a plurality of active x-ray detector elements;

a source of diverging x-rays emitted through an outer surface of the source, at least some of the diverging x-rays propagating along an x-ray propagation axis extending from the source, impinging an outer surface of the object, and propagating through the region of interest to the plurality of active x-ray detector elements, the x-ray propagation axis in a range of 3 degrees to 45 degrees relative to the outer surface of the source, the diverging x-rays received by the plurality of active x-ray detector elements having propagation paths within an angular divergence angle greater than 1 degree centered on the x-ray propagation axis, the x-ray propagation axis at an angle in a range of 1 degree to 30 degrees relative to the outer surface of the object; and a mount configured to hold the object with a portion of the mount in the propagation paths of at least some of the diverging x-rays propagating through the object to the plurality of active x-ray detector elements, the portion having an x-ray transmission greater than 30% for x-rays having energies greater than 50% of a maximum x-ray energy of an x-ray spectrum of the diverging x-rays; and at least one stage configured to rotate the mount about a rotation axis having a non-zero angle relative to the x-ray propagation axis.

2. The system of claim 1, wherein the at least one stage is configured to rotate the object while the source and the at least one x-ray detector are stationary.

3. The system of claim 1, wherein the non-zero angle is in a range greater than or equal to 45 degrees and the rotation axis is less than 30 degrees relative to a surface normal of the outer surface of the object.

4. The system of claim 1, wherein the mount is configured to offset the region of interest of the object from the at least one stage such that the diverging x-rays do not impinge the at least one stage.

5. The system of claim 1, wherein the at least one stage has a non-systematic angular wobble less than 5 microradians, a radial runout less than 1000 nanometers, and an axial runout less than 1000 nanometers.

6. The system of claim 1, further comprising a metrology system configured to measure an angular wobble of the at least one stage with an accuracy better than less than 1 microradian, to measure a radial runout accuracy of the at least one stage with an accuracy better than 1000 nanometers, and/or to measure an axial runout of the at least one stage with an accuracy better than 1000 nanometers.

7. The system of claim 1, wherein the at least one x-ray detector has at least one energy threshold for detecting x-rays, the at least one x-ray detector configured to reject and/or suppress detection of x-rays having energies below a first energy threshold and/or energies above a second energy threshold.

8. The system of claim 1, further comprising a first grating at a first position along the x-ray propagation axis, the first grating comprising an absorption grating or a phase grating, and a second grating at a second position along the x-ray propagation axis.

9. The system of claim 8, wherein the at least one x-ray detector is configured to record a Talbot pattern formed by the first grating and the second grating and/or a darkfield contrast image.

10. The system of claim 1, wherein the rotation axis is at a non-zero angle relative to a surface normal of the outer surface of the object.

11. The system of claim 1, further comprising at least one tilt stage configured to tilt the source relative to the rotation axis and/or to tilt the rotation axis relative to the source.

12. An x-ray imaging system configured to generate images of a region of interest of an object, the system comprising:

at least one x-ray detector comprising a first position-sensitive x-ray detector and a second position-sensitive x-ray detector;

a source of diverging x-rays emitted through an outer surface of the source, at least some of the diverging x-rays propagating along an x-ray propagation axis extending from the source, impinging an outer surface of the object, and propagating through the region of interest to the at least one x-ray detector, the x-ray propagation axis in a range of 3 degrees to 45 degrees relative to the outer surface of the source, the diverging x-rays received by the at least one x-ray detector having propagation paths within an angular divergence angle greater than 1 degree centered on the x-ray propagation axis; and a mount configured to hold the object with a portion of the mount in the propagation paths of at least some of the diverging x-rays propagating through the object to the at least one x-ray detector, the portion having an x-ray transmission greater than 30% for x-rays having energies greater than 50% of a maximum x-ray energy of an x-ray spectrum of the diverging x-rays; and at least one stage configured to rotate the mount about a rotation axis having a non-zero angle relative to the x-ray propagation axis.

13. The system of claim 12, wherein the second position-sensitive x-ray detector is configured to provide gain sensitivity to a different x-ray spectral portion than obtained from the first position-sensitive x-ray detector.

14. The system of claim 12, wherein the first position-sensitive x-ray detector has a first spatial resolution and the second position-sensitive x-ray detector has a second spatial resolution different from the first spatial resolution.

15. The system of claim 14, wherein the first and second position-sensitive x-ray detectors have different scintillating materials from one another and/or different scintillator thicknesses from one another.

16. The system of claim 12, wherein the first position-sensitive x-ray detector is configured to absorb and detect a first spectral portion of the x-rays transmitted through the region of interest and the second position-sensitive x-ray detector is configured to absorb and detect a second spectral portion of the x-rays transmitted through the region of interest and not absorbed by the first position-sensitive x-ray detector.

17. The system of claim 12, wherein the first position-sensitive x-ray detector is configured to transmit at least some x-ray flux received from the region of interest, and the second position-sensitive x-ray detector is positioned behind the first position-sensitive x-ray detector and configured to detect at least some of the x-ray flux transmitted through the first position-sensitive x-ray detector.

18. The system of claim 12, wherein the first position-sensitive x-ray detector comprises a scintillator screen configured to absorb a first spectral portion of the x-rays propagating along the x-ray propagation axis and to transmit a second spectral portion of the x-rays propagating along the x-ray propagation axis to impinge the second position-sensitive x-ray detector.

19. The system of claim 18, wherein the first position-sensitive x-ray detector further comprises:

a mirror configured to receive scintillation photons from the scintillator screen;

a position-sensitive photon detector; and an objective lens configured to image the scintillation photons from the mirror onto the position-sensitive photon detector.

20. The system of claim 19, wherein the mirror comprises a material and a thickness configured to transmit at least some x-rays to the second position-sensitive x-ray detector.

21. The system of claim 12, wherein the first and second position-sensitive detectors are configured to have different pixel resolutions at the object.

* * * * *